United States Patent
Suzuki et al.

(10) Patent No.: US 9,512,878 B2
(45) Date of Patent: Dec. 6, 2016

(54) METHOD OF INJECTION MOLDING A SEALING MEMBER FOR A FLUID DYNAMIC BEARING

(71) Applicant: NTN CORPORATION, Osaka-shi, Osaka (JP)

(72) Inventors: Kouyou Suzuki, Kuwana (JP); Hiroshi Niwa, Kuwana (JP); Fuminori Satoji, Kuwana (JP); Kimihiko Bito, Kuwana (JP); Yoshiharu Inazuka, Kuwana (JP)

(73) Assignee: NTN CORPORATION, Osaka-shi (JP)

( * ) Notice: Subject to any disclaimer, the term of this patent is extended or adjusted under 35 U.S.C. 154(b) by 0 days.

(21) Appl. No.: 14/168,108

(22) Filed: Jan. 30, 2014

(65) Prior Publication Data

US 2014/0145366 A1    May 29, 2014

Related U.S. Application Data

(62) Division of application No. 13/509,910, filed as application No. PCT/JP2010/070861 on Nov. 24, 2010, now abandoned.

(30) Foreign Application Priority Data

Dec. 24, 2009 (JP) .................................. 2009-292554
Feb. 15, 2010 (JP) .................................. 2010-029638

(51) Int. Cl.
*F16C 32/06* (2006.01)
*F16C 17/10* (2006.01)
(Continued)

(52) U.S. Cl.
CPC ......... *F16C 32/0629* (2013.01); *F16C 17/107* (2013.01); *F16C 33/1085* (2013.01); *F16C 33/74* (2013.01); *F16C 33/743* (2013.01); *F16C 33/745* (2013.01)

(58) Field of Classification Search
CPC ...... F16C 33/64; F16C 33/416; F16C 33/14; F16C 33/3856; B29C 49/06; B29C 47/0066; B29C 45/1759; B29C 45/38; B29C 45/0025; B29C 45/27; B29C 45/4005; B29C 45/2708
USPC ..................................... 29/898.06
See application file for complete search history.

(56) References Cited

U.S. PATENT DOCUMENTS 2,962,761 A * 12/1960 Hobson ...................... 425/451.2
8,267,588 B2   9/2012 Inazuka et al.
(Continued)

FOREIGN PATENT DOCUMENTS

CN   1957184 A   5/2007
JP   62-098029 A   5/1987
(Continued)

OTHER PUBLICATIONS

Chinese Office Action dated Mar. 4, 2014, issued in corresponding Chinese application No. 201080058175.8, w/partial English translation (10 pages).
(Continued)

*Primary Examiner* — Moshe Wilensky
(74) *Attorney, Agent, or Firm* — Westerman, Hattori, Daniels & Adrian, LLP

(57) ABSTRACT

A weld line formed by injection molding of a sealing member is formed at a circumferential position out of deepest portions of axial grooves, which form thinned portions of the sealing member (optimally, in a region of a cylindrical surface between the axial grooves in a circumferential direction). Thus, the sealing member is prevented from being provided with parts having locally markedly low strength, and hence damage to be caused by press-fitting is prevented.

7 Claims, 15 Drawing Sheets

(51) Int. Cl.
  *F16C 33/10* (2006.01)
  *F16C 33/74* (2006.01)

(56) References Cited

U.S. PATENT DOCUMENTS

| | | |
|---|---|---|
| 8,403,565 B2 | 3/2013 | Hori et al. |
| 2007/0177831 A1 | 8/2007 | Shibahara |
| 2007/0274617 A1 | 11/2007 | Shibahara et al. |
| 2008/0011551 A1* | 1/2008 | Inazuka et al. .................. 184/54 |
| 2008/0286405 A1* | 11/2008 | Huang ................ B29C 45/1759 425/557 |
| 2009/0279819 A1 | 11/2009 | Hori et al. |
| 2010/0033870 A1 | 2/2010 | Sekii et al. |
| 2010/0066073 A1* | 3/2010 | Jensen et al. ...................... 285/3 |

FOREIGN PATENT DOCUMENTS

| | | |
|---|---|---|
| JP | 06-048011 B2 | 6/1994 |
| JP | 2005-265119 A | 9/2005 |
| JP | 2006-077860 A | 3/2006 |
| JP | 2007-255593 A | 10/2007 |
| JP | 2008-169944 A | 7/2008 |
| JP | 2009-103179 A | 5/2009 |
| WO | 2008/143051 A1 | 11/2008 |

OTHER PUBLICATIONS

International Search Report dated Feb. 22, 2011, issued in corresponding application No. PCT/JP2010/070861.
Notice of Trasmittal of Translation of the International Preliminary Report on Patentability (Form PCT/IB/338) of International Patent Application No. PCT/JP2010/070861, dated Aug. 23, 2012, with Forms PCT/IB/373 and PCT/ISA/237.
Japanese Office Action dated Jul. 18, 2013, issued in corresponding Japanese Patent Application No. 2009-292554 with partial translation (7 pages).
Japanese Office Action dated Nov. 5, 2013, in corresponding Japanese Application No. 2010-029638, w/English Translation. (5 pages).
U.S. Non-Final Office Action dated Jul. 30, 2013 issued in a U.S. Appl. No. 13/509,910.
U.S. Final Office Action dated Oct. 31, 2013, issued in U.S. Appl. No. 13/509,910.

* cited by examiner

METHOD OF INJECTION MOLDING A SEALING MEMBER FOR A FLUID DYNAMIC BEARING

CROSS-REFERENCE TO RELATED APPLICATIONS

This application is a Divisional of copending application Ser. No. 13/509,910, filed on May 15, 2012, which is a §371 National Stage Application of PCT International Application No. PCT/JP2010/070861 filed on Nov. 24, 2010. The entire contents of each of the above documents is hereby incorporated by reference into the present application.

TECHNICAL FIELD

The present invention relates to a fluid dynamic bearing device in which a shaft member is supported to be relatively freely rotatable by a dynamic pressure action of a lubricating oil, which is to be generated in bearing gaps.

BACKGROUND ART

For example, in a fluid dynamic bearing device disclosed in Patent Literature 1, a bearing sleeve made of a sintered metal is fixed to an inner periphery of a bottomed cylindrical housing, and a shaft member is inserted along an inner periphery of the bearing sleeve. The shaft member is supported by a dynamic pressure action of a lubricating oil, which is to be generated in radial bearing gaps formed between an outer peripheral surface of the shaft member and an inner peripheral surface of the bearing sleeve. A sealing member is fixed to an end portion of the bearing sleeve, and the lubricating oil filling an inside of the housing is sealed by this sealing member. Specifically, the sealing member comprises an integral piece of a disk-like first sealing portion to abut against an end surface of the bearing sleeve and a cylindrical second sealing portion to abut against an outer peripheral surface of the bearing sleeve. A first seal space is formed between an inner peripheral surface of the first sealing portion and the outer peripheral surface of the shaft member, and a second seal space is formed between an outer peripheral surface of the second sealing portion and an inner peripheral surface of the housing. As described above, when the second seal space is formed on an outer-diameter side with respect to the radial bearing gaps, an axial dimension of the first seal space arranged in axial alignment with the radial bearing gaps can be reduced. Thus, bearing rigidity can be increased by reducing an axial dimension of the bearing device or by increasing a radial bearing span.

The above-mentioned sealing member is formed, for example, by injection molding of a resin.

Further, in the above-mentioned fluid dynamic bearing device, between the sealing member and the bearing sleeve, there are formed communication paths for communicating the first seal space and the second seal space to each other. Those communication paths enable pressure balance of the lubricating oil retained in both the seal spaces to be properly maintained.

Further, a fluid dynamic bearing device disclosed in Patent Literature 2 comprises: a shaft member; a bearing member having an inner periphery along which the shaft member is inserted; and a sealing member provided at an opening portion of the bearing member so as to seal a lubricating oil filling an inside of the bearing member. The sealing member of this fluid dynamic bearing device is formed by injection molding of a resin.

CITATION LIST

Patent Literature 1: JP 2007-255593 A
Patent Literature 2: JP 2005-265119 A

SUMMARY OF INVENTION

Technical Problems

In the fluid dynamic bearing devices as described above, when capacities of the seal spaces are not set with high accuracy, there are risks of oil leakage due to insufficient capacity and enlargement of the bearing device due to excessive capacity. Thus, it is necessary to set the sealing member with higher dimensional accuracy so as to set the capacities of the seal spaces with high accuracy. However, as described above, when the sealing member is formed by injection molding of a resin, molding shrinkage occurs at the time when the resin is cured, which leads to a risk that the dimensional accuracy of the sealing member, in particular, dimensional accuracy of the outer peripheral surface of the sealing member is deteriorated.

For example, when the sealing member (second sealing portion) is press-fitted to the outer peripheral surface of the bearing sleeve, a shape of the outer peripheral surface of the sealing member can be conformed to a shape of the outer peripheral surface of the bearing sleeve. With this, even when accuracy of the outer peripheral surface of the sealing member itself is low, by conforming the shape of the sealing member to the shape of the outer peripheral surface of the bearing sleeve that has been processed with high accuracy, the accuracy of the outer peripheral surface of the sealing member can be increased. However, when the sealing member is press-fitted to the bearing sleeve in this way, a high load is applied to the sealing member, which leads to a risk that the sealing member is subjected to damage such as cracking.

For example, as described above, when the sealing member is an injection-molded product of a resin, a weld line may be formed at a merging portion of the resin that has been injected into a cavity. Such a portion formed a weld-line is more fragile than other regions, and hence the damage to be caused by press-fitting as described above is liable to start from this portion. In particular, when the communication paths for communicating the first seal space and the second seal space to each other are formed of axial grooves formed in an inner peripheral surface of the sealing member, a thickness of the sealing member is reduced by an amount of the axial grooves thus formed. As a result, strength of the sealing member is reduced. When the fragile portion with the weld line is formed in such a thin portion, strength of this part is locally markedly reduced, which leads to a higher risk that the damage as described above is caused by press-fitting.

As a countermeasure, for example, when a thickness of the sealing member is generally increased to enhance the strength, the damage to be caused by press-fitting is prevented. However, such a countermeasure causes higher material cost and an increase in dimension of the fluid dynamic bearing device in general, and hence is not preferred.

Alternatively, when the sealing member is formed by injection molding in a manner that the weld line is not formed, the strength can be increased. For example, as illustrated in FIG. 10a, when a pin gate 103 is provided at a center of a bottom portion 102 of a bottomed cylindrical cavity 101 and a molten resin is injected from the pin gate 103, the molten resin flows in all circumferential directions without being divided (refer to FIG. 10b). Thus, the weld line is not formed. However, in this case, as illustrated in FIG. 11, it is necessary to perform a step of removing a central part 120 of a bottom portion 111 of a bottomed cylindrical molded product 110, and hence processing becomes more troublesome.

Similarly, the weld line is not formed also when an annular film gate is provided to a die set for molding the sealing member (not shown). However, in this case, an annular gate mark is formed on the molded product, and hence an operation of removing the gate mark is required, which is troublesome.

It is a first object to be achieved by the present invention to prevent the sealing member from being damaged by press-fitting into the bearing sleeve without increasing a thickness of the sealing member or employing a troublesome producing method.

Further, Patent Literature 2 above discloses a method of forming a sealing member 200 by injecting, as illustrated in FIG. 27a, a molten resin Q from a gate 202 (film gate) provided at a position corresponding to an outer peripheral edge portion of an outer end surface 201 (end surface on an atmosphere contact side) of the sealing member 200. In this method, as illustrated in FIG. 27b, a gate cutting mark 203 projected from the outer end surface 201 of the sealing member 200 is formed, and hence there is a risk that the gate cutting mark 203 comes into contact with other members such as a disk hub. In particular, in the injection molding method disclosed in Patent Literature 2, the gate portion of the resin-molded product is cut off by being plucked simultaneously with opening the die set, and hence the resin of the gate portion is stretched before being perfectly cured. Thus, it is difficult to control a projecting amount of the gate mark, which leads to a higher risk that the gate cutting mark 203 projects from the outer end surface 201 of the sealing member 200 and comes in contact with members on a rotary side (disk hub and the like). Thus, after the sealing member 200 is taken out of the die set, it is necessary to perform a post-treatment process on the gate cutting mark 203 (removal process along the line X in FIG. 27b). Thus, manhours increase, with the result that higher processing cost is required.

For example, as illustrated in FIG. 28, when a gate mark 302 is formed in a spot-facing portion (sunk part with respect to an end surface) 303 provided in an end surface 301 of a sealing member 300, the gate mark 302 is prevented from projecting from the end surface 301 of the sealing member. However, in order to form the spot-facing portion 303, a die set for molding the sealing member 300 has to have more complicated shape, which leads to an increase in processing cost. In addition, for example, when an oil-repellent agent is applied to the end surface 301, there is a risk that the oil-repellent agent pools in the spot-facing portion 303 and more of the oil-repellent agent is wasted. In particular, as illustrated in FIG. 28, when an outer peripheral side of the spot-facing portion 303 is continuous with an outer peripheral surface 304 of the sealing member 300, there is a risk that the oil-repellent agent pooled in the spot-facing portion 303 flows down to the outer peripheral surface 304 and causes various failures. For example, when the outer peripheral surface 304 of the sealing member 300 serves as a seal surface for forming a seal space and the oil-repellent agent flows down to this seal surface, there is a risk that oil in the seal space is repelled by the oil-repellent agent and sealing properties are deteriorated. Alternatively, when the outer peripheral surface 304 of the sealing member 300 serves as a bonding fixation surface with respect to other members and the oil-repellent agent flows down to the bonding fixation surface, there is a risk that an adhesive cannot be uniformly applied and the sealing member 300 is less firmly fixed.

Further, Patent Literature 2 above discloses an example in which, as illustrated in FIG. 29, gates 402 (pin gates) are provided at positions corresponding to an inner end surface 401 (end surface on an oil contact side) of a sealing member 400 (the sealing member 400 illustrated in FIG. 29 is upside-down with respect to the sealing member 200 illustrated in FIG. 27a). In this case, gate cutting marks are formed on the inner end surface 401 of the sealing member 400, and fine resin remnants are formed on the gate cutting marks. Thus, when the gate cutting marks come into contact with the lubricating oil, there is a risk that the resin remnants are mixed as contaminants into the lubricating oil. In particular, when the gate portions of the resin-molded product are cut off by being plucked simultaneously with opening the die set, there is a risk that the gate cutting marks are fluffed and a large number of resin remnants are generated. Thus, the risk that contaminants are mixed into the lubricating oil becomes higher.

It is a second object to be achieved by the present invention to prevent the gate marks of the sealing member from coming into contact with other members without causing an increase in processing cost or entry of contaminants into the lubricating oil in a fluid dynamic bearing device comprising the sealing member that is an injection-molded product of a resin.

Solution to Problems

In order to achieve the above-mentioned first object, the present invention provides a fluid dynamic bearing device, comprising: a shaft member; a bearing sleeve having an inner periphery along which the shaft member is inserted; a housing having an inner periphery by which the bearing sleeve is held; a sealing member comprising an injection-molded product of a resin and having: a large-diameter inner peripheral surface which is fixed to an outer peripheral surface of an end portion of the bearing sleeve by press-fitting; and a small-diameter inner peripheral surface; a radial bearing portion for generating a dynamic pressure action of a lubricating oil in a radial bearing gap between an outer peripheral surface of the shaft member and an inner peripheral surface of the bearing sleeve so as to support the shaft member in a radial direction; a first seal space formed between the small-diameter inner peripheral surface of the sealing member and the outer peripheral surface of the shaft member so as to seal the lubricating oil filling an inside of the housing; a second seal space formed between an outer peripheral surface of the sealing member and an inner peripheral surface of the housing so as to seal the lubricating oil filling the inside of the housing; and a communication path formed between the sealing member and the bearing sleeve so as to communicate the first seal space and the second seal space to each other, wherein an axial groove is formed in the large-diameter inner peripheral surface of the sealing member so as to form the communication path, and wherein a weld line as a result of injection molding is formed at a circumferential position out of a deepest portion of the axial groove.

As described above, when the weld line as a result of injection molding of the sealing member is formed at the circumferential position out of the deepest portion of the axial groove, which forms a thinned portion of the sealing member, the sealing member is prevented from being provided with parts having locally low strength, and hence damage to be caused by press-fitting is prevented. For example, when the axial groove formed in the large-diameter inner peripheral surface of the sealing member comprises a plurality of axial grooves, it is preferred that the weld line be formed in a region between the plurality of axial grooves in a circumferential direction.

For the same reason, when a radial groove is formed in an inner end surface of the sealing member so as to form a part of the communication path, it is preferred that the weld line be formed at a circumferential position out of a deepest portion of the radial groove.

When a linear expansion coefficient of the sealing member is larger than a linear expansion coefficient of the bearing sleeve, under a high temperature environment, an amount of radial expansion of the inner peripheral surface of the sealing member, which is caused by thermal expansion, is larger than a radial expansion amount of the outer peripheral surface of the bearing sleeve. Thus, a press-fitting margin of the sealing member and the bearing sleeve is reduced. Also in such a case, it is necessary to set the press-fitting margin at a normal temperature to be relatively large so that a fixation force of the sealing member and the bearing sleeve is secured. In accordance therewith, load to be applied by press-fitting to the sealing member becomes much higher, and hence there is a higher risk that the sealing member is damaged. Thus, when the linear expansion coefficient of the sealing member is larger than the linear expansion coefficient of the bearing sleeve, it is particularly preferred to apply a structure of the present invention.

For example, as for a fluid dynamic bearing device to be used in a disk drive device for HDDs, which has a shaft member whose diameter ranges from 2 mm to 4 mm, when the press-fitting margin of the sealing member and the bearing sleeve (difference in diameter between the sealing member and the bearing sleeve) is set to 40 μm or more, a sufficient fixation force can be obtained. In addition, the outer peripheral surface of the sealing member can be conformed to the shape of the bearing sleeve. Note that, press-fitting operation is difficult when the press-fitting margin is excessively large. Thus, it is preferred to set the press-fitting margin of the sealing member and the bearing sleeve to 60 μm or less.

The lubricating oil filling the inside of the housing comprises an ester-based lubricating oil.

By the way, in the injection-molded product of a resin, strength of a portion formed a weld-line is influenced by a curing speed of a molten resin charged in the cavity. Specifically, strength of the portion tends to decrease when the resin is quickly cured, and the strength of the portion tends to increase when the resin is slowly cured. Meanwhile, the sealing member is constantly held in contact with the lubricating oil (in particular, ester-based lubricating oil) filling the inside of the housing, and hence, when a resin for the sealing member is poor in oil resistance, there is a risk that strength of the sealing member decreases or stress cracks occur. Thus, it is preferred that the resin for the sealing member be slowly cured and excellent in oil resistance. Examples of such a resin comprise crystalline resins, in particular, a crystalline resin selected from a group consisting of PPS, ETFE, PEEK, PA66, PA46, PA6T, and PA9T.

The communication path can be formed, for example, of an axial groove formed in an outer peripheral surface of the bearing sleeve and the above-mentioned axial groove of the sealing member.

For example, in a case where the axial groove formed in the inner peripheral surface of the sealing member comprises an odd number of axial grooves, when a gate for injection molding of the sealing member is provided at a circumferential position of one of the odd number of axial grooves, the weld line can be provided at the circumferential position out of the deepest portion of the odd number of axial grooves.

Further, in order to achieve the above-mentioned second object, the present invention provides a fluid dynamic bearing device comprising: a shaft member; a bearing member having an inner periphery along which the shaft member is inserted; a sealing member fixed to an opening portion of the bearing member so as to seal a lubricating oil filling an inside of the bearing member; and a radial bearing portion for generating a dynamic pressure action of a lubricating oil in a radial bearing gap between an outer peripheral surface of the shaft member and an inner peripheral surface of the bearing sleeve so as to support the shaft member in a radial direction; wherein the sealing member comprises an injection-molded product formed by injecting a resin from a side gate, and wherein a gate mark with respect to the side gate is formed at a position lower than an axial position of an outer end surface of the sealing member.

In this way, when the sealing member is formed by injection of a resin from what is called a side gate formed in a die opening surface of a die set, a gate portion of a resin-molded product is not plucked off by die opening, and hence the gate mark is not stretched. In this way, the gate mark to be formed on an outer peripheral surface of the sealing member can be provided at a position lower than the axial position of the outer end surface of the sealing member. Thus, a situation in which the gate mark comes into contact with other members such as a disk hub is prevented.

Further, when the gate mark is provided at a position out of contact with the lubricating oil, it is possible to avoid a risk that resin remnants generated on the gate mark are mixed as contaminants into the lubricating oil. Note that, the "position out of contact with the lubricating oil" means a position out of contact with the lubricating oil inside the bearing member sealed by the sealing member, and hence does not exclude a position at which a lubricating oil having leaked from the inside of the bearing member may come into contact with the gate mark. For example, when a seal space is formed of the outer peripheral surface of the sealing member, it suffices that, on the outer peripheral surface of the sealing member, the gate mark is formed on the atmosphere side with respect to an oil surface within the seal space. Further, when the inner end surface of the sealing member is held in contact with the lubricating oil and the outer peripheral surface of the sealing member is fixed to the bearing member, it suffices that, on the outer peripheral surface of the sealing member, the gate mark is formed at a position out of an inner end portion of a fixation surface with respect to the bearing member. In particular, in the latter case, when the gate mark projects to an outer-diameter side from the fixation surface provided with respect to the bearing member, there is a fear in that fixation to the bearing member is disturbed, and hence it is preferred that the gate mark be formed on an inner-gate side with respect to the fixation surface provided with respect to the bearing member.

The gate mark can be formed, for example, on a chamfered portion formed at an upper end of the outer peripheral surface of the sealing member.

As described above, when the gate mark is formed on the outer peripheral surface of the sealing member, the outer end surface of the sealing member can be flattened. Thus, even when an oil-repellent agent is applied to this end surface, there occurs no problem such as an increase in amount of wasted oil-repellent agent or flowing of the oil-repellent agent down to the outer peripheral surface of the sealing member unlike the case where the spot-facing portion is provided in the end surface (refer to FIG. 17).

Further, when a treatment process after cutting the gate portion of the sealing member is omitted, man-hours decrease, with the result that processing cost is reduced.

It is necessary to secure a predetermined area or larger for the gate such that predetermined pressure or higher (dwell pressure) can be applied to a resin filling an inside of the cavity. When an axial dimension of the gate is increased so that the area of the gate is secured, an axial dimension of the sealing member increases in accordance therewith, with the result that the bearing device as a whole is enlarged. Thus, it is desired that the area of the gate be secured in the circumferential dimension. In this case, the circumferential dimension of the gate mark is larger than the axial dimension of the gate mark.

The sealing member as described above can be manufactured by the steps of: injecting a molten resin from a runner into a cavity through a side gate formed in a molding surface for molding the outer peripheral surface of the sealing member; taking out, after the resin has been cured, a resin-molded product formed of an integral piece of a runner resin portion cured in a runner and the sealing member from a die set; and separating the runner resin portion and the sealing member from each other.

As described above, in the die set for molding the sealing member, when the side gate is provided in the molding surface for molding the outer peripheral surface of the sealing member, the gate mark is not stretched simultaneously with die opening, and the gate mark is prevented from projecting from the end surface of the sealing member. In particular, when the runner resin portion and the sealing member of the resin-molded product taken out of the die set are separated from each other by bending a boundary portion between the runner resin portion and the sealing member, a situation in which the gate mark is stretched is reliably prevented.

In this case, when a V groove is provided at a boundary portion between the runner resin portion and the outer peripheral surface of the sealing member in the resin-molded product taken out of the die set, the resin-molded product can be accurately cut at the gate portion from the V groove.

Advantageous Effects of Invention

As described hereinabove, according to the present invention, without increasing the thickness of the sealing member or employing a troublesome producing method for the sealing member, the sealing member is prevented from being damaged by press-fitting to the bearing sleeve.

Further, according to the present invention, without causing an increase in processing cost or entry of contaminants into the lubricating oil, it is possible to reliably prevent a situation that the gate mark of the sealing member, which is an injection-molded product of a resin, comes into contact with other members such as the disk hub.

BRIEF DESCRIPTION OF DRAWINGS

FIG. 10b A sectional view taken along the line Y-Y of the die set of FIG. 10a.

FIG. 28b A sectional view of the sealing member of FIG. 28a.

DESCRIPTION OF EMBODIMENTS

In the following, description is made of an embodiment of a first invention of the subject application with reference to the drawings.

Figure 1:
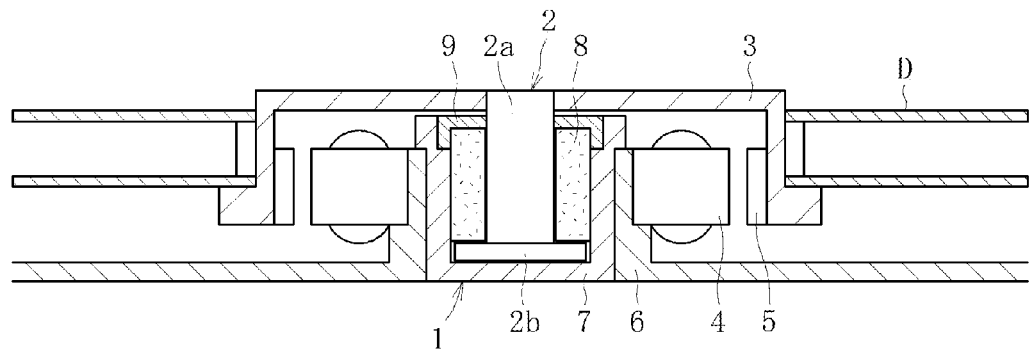
FIG. 1 A sectional view of a spindle motor of a disk drive device for HDDs.

FIG. 1 illustrates a spindle motor for information apparatus, which incorporates a fluid dynamic bearing device 1 according to the embodiment of the present invention. This spindle motor is used for disk drive devices for, for example, HDDs, and comprises the fluid dynamic bearing device 1 for rotatably supporting a shaft member 2 having a diameter in range from 2 mm to 4 mm, a disk hub 3 mounted to the shaft member 2, and stator coils 4 and rotor magnets 5 facing each other across a radial gap, for example. The stator coils 4 are fixed to an outer peripheral surface of a bracket 6, and the rotor magnets 5 are fixed to an inner peripheral surface of the disk hub 3. The fluid dynamic bearing device 1 is mounted to an inner periphery of the bracket 6. The disk hub 3 holds a predetermined number of disks D (two disks in FIG. 1) such as a magnetic disk. When the stator coils 4 are energized, the rotor magnets 5 are rotated by an electromagnetic force between the stator coils 4 and the rotor magnets 5. With this, the disk hub 3 and the shaft member 2 are rotated integrally with each other.

Figure 2:
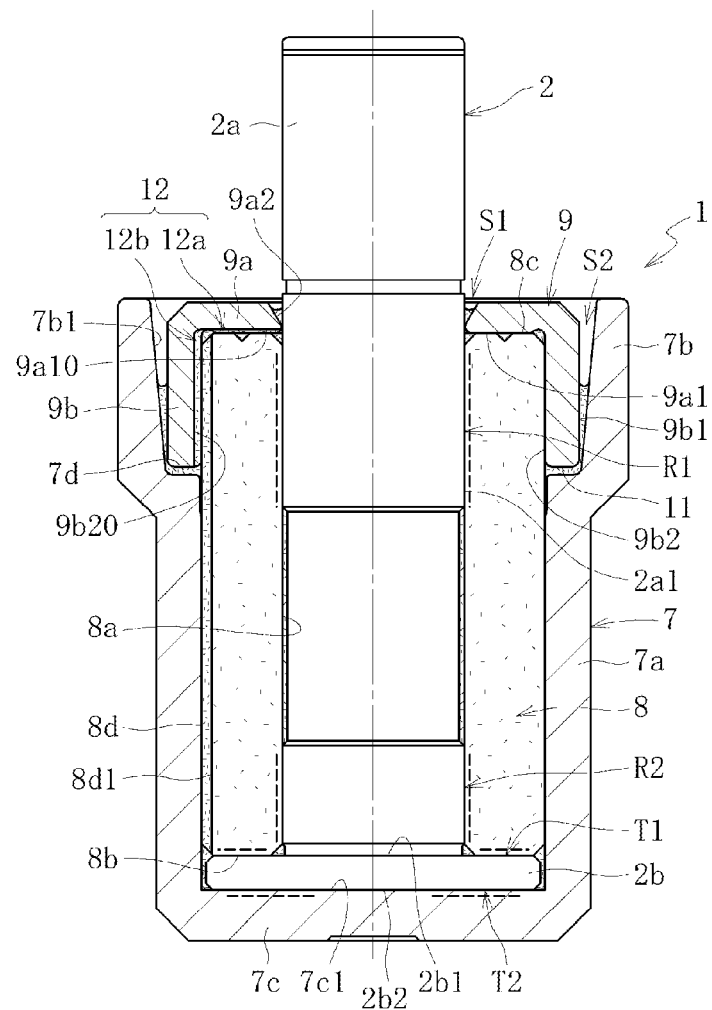
FIG. 2 A sectional view of a fluid dynamic bearing device.

The fluid dynamic bearing device 1 illustrated in FIG. 2 comprises, as main components, the shaft member 2, a bottomed-cylindrical housing 7 opened at one end and closed at another end, a bearing sleeve 8 fixed to an inner peripheral surface of the housing 7 and having an inner periphery along which the shaft member 2 is inserted, and a sealing member 9 for sealing the opening portion of the housing 7. Note that, in the following, for the sake of convenience in description, in an axial direction, the opening side of the housing 7 is referred to as an upper side, and the opposite side is referred to as a lower side.

The shaft member 2 is made of, for example, a metal material such as a stainless steel, and comprises a shaft portion 2a, and a flange portion 2b provided at a lower end of the shaft portion 2a integrally or as a separate member. The shaft member 2 may be entirely made of a metal material, or may have a hybrid structure of a metal and a resin, which is obtained, for example, by forming a part (for example, both end surfaces) or the entirety of the flange portion 2b with a resin.

The bearing sleeve 8 is obtained by forming a sintered metal containing, for example, copper (or copper and iron) as a main component into a cylindrical shape. Alternatively, the bearing sleeve 8 may be formed of a soft metal such as brass.

On an inner peripheral surface 8a of the bearing sleeve 8, there are provided upper and lower regions (dotted line parts of FIG. 2) to serve as respective radial bearing surfaces of a first radial bearing portion R1 and a second radial bearing portion R2 in a manner that the first radial bearing portion R1 and the second radial bearing portion R2 are axially spaced apart from each other. In those two regions, there are respectively formed dynamic pressure generating grooves 8a1 and 8a2 of a herringbone pattern as illustrated, for example, in FIG. 3. The dynamic pressure generating grooves 8a1 on the upper side are formed asymmetrically in the axial direction with respect to a belt-like part at an axially central portion of hill portions (indicated by cross-hatching in FIG. 3). Specifically, an axial dimension X1 of an upper region with respect to the belt-like part is larger than an axial dimension X2 of a lower region with respect to the belt-like part.

On a lower end surface 8b of the bearing sleeve 8, there is provided a region (dotted line parts of FIG. 2) to serve as a thrust bearing surface of a first thrust bearing portion T1. In this region, although not shown, there are formed dynamic pressure generating grooves arranged, for example, in a spiral pattern. In an outer peripheral surface 8d of the bearing sleeve 8, there is formed an axial groove 8d1 for communicating both end surfaces 8b and 8c to each other. In this embodiment, for example, the axial groove 8d1 comprises three equiangularly arranged axial grooves 8d1 (refer to FIG. 8).

As illustrated in FIG. 2, the housing 7 is formed of a cylindrical small diameter portion 7a, a cylindrical large diameter portion 7b arranged on the small diameter portion 7a, and a bottom portion 7c sealing the opening portion at the lower end of the small diameter portion 7a. The small diameter portion 7a, the large diameter portion 7b, and the bottom portion 7c are formed integrally with each other. An inner peripheral surface of the small diameter portion 7a and an inner peripheral surface 7b1 of the large diameter portion 7b are continuous with each other through intermediation of a stepped surface 7d formed as a flat surface extending in a direction orthogonal to the axial direction.

On an inner bottom surface 7c1 of the bottom portion 7c of the housing 7, there is provided a region (dotted line parts of FIG. 2) to serve as a thrust bearing surface of a second thrust bearing portion T2. In this region, there are formed dynamic pressure grooves (not shown) arranged, for example, in a spiral pattern.

The housing 7 structured as described above is formed by injection molding of a resin. In order to prevent deformation due to difference in shrinkage amount upon molding shrinkage, the small diameter portion 7a, the large diameter portion 7b, and the bottom portion 7c of the housing 7 are formed to have thicknesses substantially equal to each other. The resin forming the housing 7 is mainly formed of a thermoplastic resin, and examples of the resin that can be used comprise amorphous resins such as polysulfone (PSU), polyethersulfone (PES), polyphenylsulfone (PPSU), and polyetherimide (PEI), and crystalline resins such as liquid crystal polymer (LCP), polyetheretherketone (PEEK), polybutylene terephthalate (PBT), polyphenylene sulfide (PPS), and polyamide (PA). Examples of filler that may be used with the above-mentioned resin comprise fibrous filler such as glass fiber, whisker-like filler such as potassium titanate, scale-like filler such as mica, and fibrous or powdered conductive filler such as carbon fiber, carbon black, graphite, carbon nanomaterial, and metal powder. Such filler may be used singly or in a combination of two or more kinds of filler.

Figure 4:
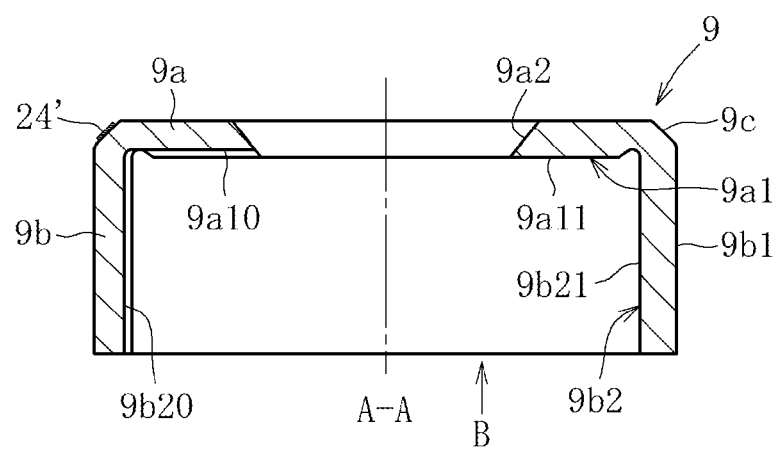
FIG. 4 A sectional view taken along the line A-A (FIG. 5) of a sealing member.
Figure 5:
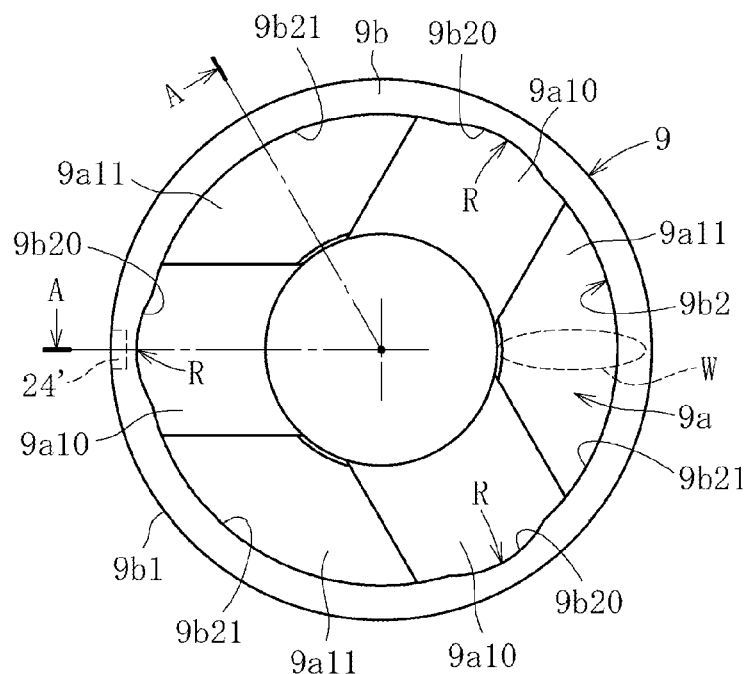
FIG. 5 A plan view of the sealing member viewed in a direction of the arrow B of FIG. 4.

As illustrated in FIG. 4, the sealing member 9 is formed into an L-shape in cross-section comprising a disk-like first sealing portion 9a and a cylindrical second sealing portion 9b projecting downward from an outer-diameter end of the first sealing portion 9a. An inner peripheral surface 9a2 of the first sealing portion 9a forms a small-diameter inner peripheral surface of the sealing member 9, and an inner peripheral surface 9b2 of the second sealing portion 9b forms a large-diameter inner peripheral surface of the sealing member 9. In an inner end surface (lower end surface 9a1) of the first sealing portion 9a, there are formed a predetermined number of radial grooves 9a10 horizontally extending in a radial direction across the lower end surface 9a1. In the inner peripheral surface 9b2 of the second sealing portion 9b, there are formed a predetermined number of axial grooves 9b20 vertically extending in the axial direction across the inner peripheral surface 9b2 at the same circumferential positions as those of the radial grooves 9a10. In this embodiment, each of the radial grooves 9a10 of the first sealing portion 9a is formed into a rectangular shape in cross-section (not shown), and each of the axial grooves 9b20 of the second sealing portion 9b is formed into a circular-arc shape in cross-section (refer to FIG. 5). Further, the radial groove 9a10 and the axial groove 9b20 respectively comprise three radial grooves 9a10 and three axial grooves 9b20, which are equiangularly arranged.

At an upper end portion of an outer peripheral surface 9b1 of the second sealing portion 9b, there is formed a chamfered portion 9c (refer to FIG. 4). On the chamfered portion 9c, a gate mark 24' is formed at a circumferential position corresponding to a deepest portion R of one of the axial grooves 9b20 (refer to FIG. 5). A weld line W is formed at a position on the opposite side of the gate mark 24' with respect to an axial center. The weld line W is formed so as to horizontally extend in the radial direction across the first sealing portion 9a and vertically extend in the axial direction across the second sealing portion 9b. The weld line W of the second sealing portion 9b is formed at a circumferential position out of the deepest portions R of the axial grooves 9b20. In this embodiment, the weld line W of the second sealing portion 9b is formed in a region of a cylindrical surface 9b21 between the axial grooves 9b20 in the circumferential direction. Further, the weld line W of the first sealing portion 9a is formed at a circumferential position out of deepest portions of the radial grooves 9a10. In this embodiment, the weld line W of the first sealing portion 9a is formed in a region of a flat surface 9a11 between the radial grooves 9a10 in the circumferential direction. As described above, the weld line W is formed at the positions out of thin portions of the sealing member 9.

The sealing member 9 structured as described above is formed by injection molding of a resin. It is preferred to select, as the resin for the sealing member 9, a material which is relatively slowly cured and is excellent in oil resistance. For example, it is possible to suitably use crystalline resins, specifically, a crystalline resin selected from a group consisting of PPS, ETFE, PEEK, PA66, PA46, PA6T, and PA9T. More specifically, the following can be used.

PPS: cross-linked PPSRG-40JA and linear PPSRE-04 manufactured by AGC MATEX CO., LTD.;

ETFE: Neoflon EP-521 and EP-541 manufactured by DAIKIN INDUSTRIES, ltd.;

PEEK: PEEK 150GL15, PEEK 150GL30, PEEK 450GL15, and PEEK 450GL30 manufactured by Victrex plc.;

PA66: A3HG5 manufactured by BASF SE;

PA46: TW300 manufactured by DSM N.V.;

PA6T: ARLEN RA230NK manufactured by Mitsui Chemicals, Inc.; and

PA9T: Genestar GR2300 manufactured by KURARAY CO., LTD. It can be said that, of those crystalline resins, PA6T is an optimum material for the sealing member because PAT6 exhibits most excellent properties, specifically, provides highest strength to portions at which the weld line W is to be formed and highest oil resistance against an ester-based lubricating oil. Note that, those crystalline resins may be used singly or in a combination of a plurality of types of those crystalline resins. Alternatively, it is possible to add the filler referred to in the above description of the material for the housing 7.

Figure 6:
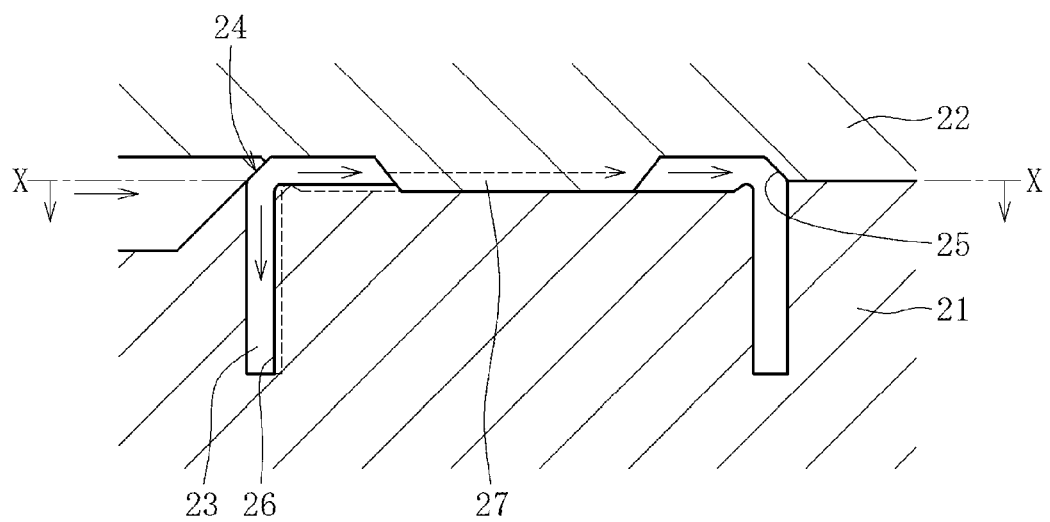
FIG. 6 A sectional view of a die set for forming the sealing member by injection molding.
Figure 7:
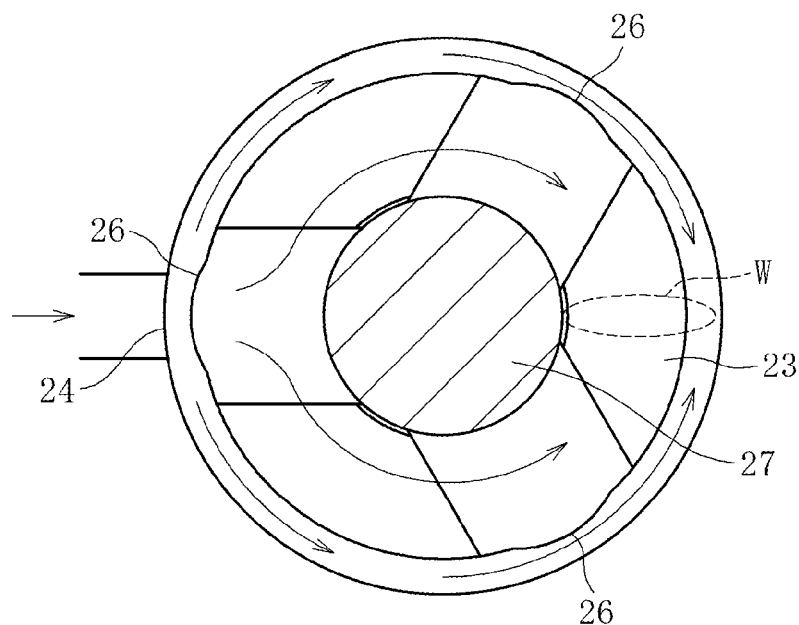
FIG. 7 A sectional view taken along the line X-X of the die set of FIG. 6.

Here, description is made of injection molding of the sealing member 9. A die set used for injection molding of the sealing member 9 is formed of a fixed die 21 and a movable die 22 as illustrated in FIG. 6, and a cavity 23 and a gate 24 are formed in a clamped state. The gate 24 is what is called a side gate provided in a clamping surface of the fixed die 21 and the movable die 22. The gate 24 is provided in a tapered surface 25 provided to form the chamfered portion 9c, and is arranged to come to a circumferential position of one of molding portions 26 provided to form the axial grooves 9b20 of the second sealing portion 9b (refer to FIG. 7). In this state, when a molten resin is injected from the gate 24, a flow of the resin is bisected by a projecting portion 27 provided to form a hollow portion at an axial center of the first sealing portion 9a, and then the bisected flows merge on the opposite side of the gate 24. In this embodiment, an odd number of (three) axial grooves 9b20 are arranged at equal intervals in the inner peripheral surface of the second sealing portion 9b. Thus, an opposite side of each of the axial grooves 9b20 with respect to the axial center corresponds to a circumferential central portion between the other axial grooves 9b20. Therefore, when the gate 24 is arranged at a circumferential position corresponding to the deepest portion of one of the axial grooves 9b20, the weld line W is formed at the circumferential central portion between the other axial grooves 9b20.

As illustrated in FIG. 2, the sealing member 9 formed as described above is fixed to an upper end of an outer periphery of the bearing sleeve 8 by press-fitting. Specifically, the inner peripheral surface 9b2 of the second sealing portion 9b of the sealing member 9 is press-fitted to the outer peripheral surface 8d of the bearing sleeve 8 from above. In this case, a press-fitting margin of the sealing member 9 and the bearing sleeve 8 is set within a range of from 40 μm to 60 μm. With this, the outer peripheral surface 9b1 of the second sealing portion 9b deforms in conformity with the outer peripheral surface 8d of the bearing sleeve 8, and hence dimensional accuracy is increased. In this case, as described above, the fragile weld line W is formed at the position out of thin portions of the sealing member 9 (the deepest portion of the radial groove 9a10 of the first sealing portion 9a and the deepest portion of the axial groove 9b20 of the second sealing portion 9b). Thus, the sealing member 9 is prevented from being provided with parts having locally markedly low strength, and hence damage to be caused by press-fitting is prevented.

Under a state in which the sealing member 9 is fixed to the bearing sleeve 8, the lower end surface 9a1 of the first sealing portion 9a of the sealing member 9 abuts against the upper end surface 8c of the bearing sleeve 8, and the lower end surface of the second sealing portion 9b faces the stepped surface 7d of the housing 7 across a predetermined axial gap 11. Further, a first seal space S1 having a predetermined capacity is formed between the inner peripheral surface 9a2 of the first sealing portion 9a and an outer peripheral surface 2a1 of the shaft portion 2a, and a second seal space S2 having a predetermined capacity is formed between the outer peripheral surface 9b1 of the second sealing portion 9b and the inner peripheral surface 7b1 of the large diameter portion 7b of the housing 7. In this embodiment, the inner peripheral surface 9a2 of the first sealing portion 9a and the inner peripheral surface 7b1 of the large diameter portion 7b of the housing 7 are each formed as a tapered surface increased upward in diameter. Accordingly, the first seal space S1 and the second seal space S2 each exhibit a tapered shape gradually diminished downward.

In this case, between the lower end surface 9a1 of the first sealing portion 9a and the upper end surface 8c of the bearing sleeve 8 and between the inner peripheral surface 9b2 of the second sealing portion 9b and the outer peripheral surface 8d of the bearing sleeve 8, there are formed communication paths 12 for communicating the first seal space S1 and the second seal space S2 to each other. Specifically, each of the radial grooves 9a10 formed in the lower end surface 9a1 of the first sealing portion 9a and the upper end surface 8c of the bearing sleeve 8 form a radial communication path 12a, and each of the axial grooves 9b20 formed in the inner peripheral surface 9b2 of the second sealing portion 9b and corresponding one of the axial grooves 8d1 formed in the outer peripheral surface 8d of the bearing sleeve 8 form an axial communication path 12b (refer to FIG. 8).

Figure 8:
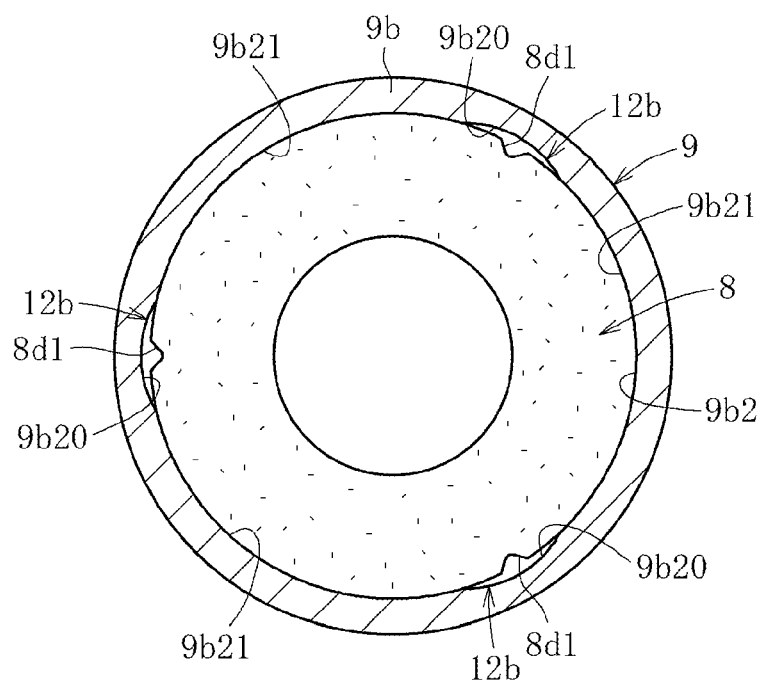
FIG. 8 A sectional view illustrating a state in which the bearing sleeve and the sealing member are fixed to each other by press-fitting.

In order to maintain pressure balance of a lubricating oil in both the seal spaces S1 and S2 within a proper range, the communication paths 12 need to have a predetermined flow-path area or more. For example, when a cross-sectional area of the axial grooves 9b20 formed in the second sealing portion 9b is increased, the second sealing portion 9b is partially thinned, with the result that strength decreases. However, the second sealing portion 9b receives high load by being press-fitted to the bearing sleeve 8, and hence it is necessary to secure strength as high as possible. In order to secure high strength, as illustrated in FIG. 8, the following structure may be employed. The axial communication paths 12b may be formed with cooperation of the axial grooves 9b20 of the second sealing portion 9b and the axial grooves 8d1 of the bearing sleeve 8, thereby securing the flow-path area of the axial communication paths 12b while downsizing the axial grooves 9b20 of the second sealing portion 9b and securing strength of the sealing member 9.

In the above-mentioned structure, the interior space of the housing 7, which is sealed with the sealing member 9 and comprises inner pores of the bearing sleeve 8, is filled with a lubricating oil (for example, ester-based lubricating oil), and thus the fluid dynamic bearing device 1 as illustrated in FIG. 2 is completed.

When the shaft member 2 is rotated, radial bearing gaps are formed between the radial bearing surfaces of the inner peripheral surface 8a of the bearing sleeve 8 and the outer peripheral surface 2a1 of the shaft portion 2a. Further, thrust bearing gaps are formed respectively between the thrust bearing surface of the lower end surface 8b of the bearing sleeve 8 and an upper end surface 2b1 of the flange portion 2b and between the thrust bearing surface of the inner bottom surface 7c1 of the housing 7 and a lower end surface 2b2 of the flange portion 2b. Further, along with rotation of the shaft member 2, a dynamic pressure of a lubricating oil is generated in the radial bearing gaps due to the dynamic pressure generating grooves 8a1 and 8a2 of the radial bearing surfaces, and the shaft portion 2a of the shaft member 2 is rotatably supported in the radial direction in a non-contact manner through a lubricating oil film formed within the radial bearing gaps. As a result, there are formed the first radial bearing portion R1 and the second radial bearing portion R2 for rotatably supporting the shaft member 2 in the radial direction in a non-contact manner. Simultaneously, a dynamic pressure of a lubricating oil is generated in the thrust bearing gaps due to the dynamic pressure generating grooves of the thrust bearing surfaces, and the shaft member 2 is rotatably supported in the thrust direction in a non-contact manner through a lubricating oil film formed in the thrust bearing gaps. As a result, there are formed the first thrust bearing portion T1 and the second thrust bearing portion T2 for rotatably supporting the shaft member 2 in both the thrust directions in a non-contact manner.

Further, during rotation of the shaft member 2, the first and second seal spaces S1 and S2 each exhibit a tapered shape gradually diminished toward the inside of the housing 7 as described above. Therefore, owing to drawing-in action caused by a capillary force, a lubricating oil in both the seal spaces S1 and S2 is drawn in a direction in which the seal spaces are narrowed, that is, drawn toward the inside of the housing 7. As a result, it is possible to effectively prevent leakage of the lubricating oil from the inside of the housing 7. Further, the seal spaces S1 and S2 each have a buffering function with which the volume amount varied in accordance with the variation in temperature of the lubricating oil filling the interior spaces of the housing 7 is absorbed. Within the expected range of the variation in temperature, the oil surfaces of the lubricating oil are constantly formed in the seal spaces S1 and S2.

Figure 3:
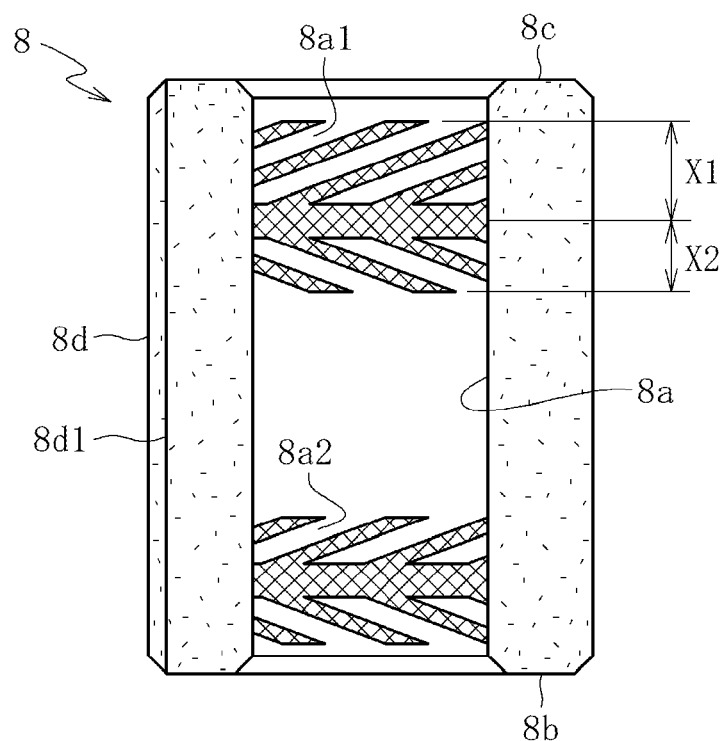
FIG. 3 A sectional view of a bearing sleeve.

As described above, the dynamic pressure generating grooves 8a1 on the upper side are formed asymmetrically in the axial direction (refer to FIG. 3). Thus, during rotation of the shaft member 2, there is generated a force by which the lubricating oil in the radial bearing gaps is pushed downward, and the force thus generated circulates the lubricating oil through the path formed of the thrust bearing gap of the first thrust bearing portion T1, the fluid paths formed of the axial grooves 8d1 of the bearing sleeve 8, and the communication paths 12 between the sealing member 9 and the bearing sleeve 8 in the stated order. With this, the pressure balance of the lubricating oil can be maintained, and it is possible to solve problems such as generation of bubbles due to local generation of a negative pressure, and leakage of the lubricating oil and occurrence of vibration caused by the generation of bubbles. The first seal space S1 communicates to the above-mentioned circulation path, and the second seal space S2 communicates thereto via the axial gap 11. Thus, even when bubbles are mixed into the lubricating oil for some reason or other, such bubbles are discharged into the atmosphere via the oil surfaces of the lubricating oil within those seal spaces S1 and S2 when the bubbles circulate with the lubricating oil. Thus, adverse effects caused by the bubbles are prevented even more effectively.

The present invention is not limited to the above-mentioned embodiment. For example, in the above-mentioned embodiment, the gate 24 used at the time of forming the sealing member 9 by injection molding is provided at one point, but the present invention is not limited thereto. The gate may comprise gates provided at a plurality of points.

Further, in the above-mentioned embodiment, the inner peripheral surface 9a2 of the first sealing portion 9a is formed into a tapered shape, but the present invention is not limited thereto. The inner peripheral surface 9a2 of the first sealing portion 9a may be formed as a cylindrical surface, and the outer peripheral surface of the shaft portion 2a opposed thereto may be formed as a tapered surface. Still further, in the above-mentioned embodiment, the inner peripheral surface 7b1 of the large diameter portion 7b of the housing 7 is formed as a tapered surface. Instead, the inner peripheral surface 7b1 may be formed as a cylindrical surface, and the outer peripheral surface 9b1 of the second sealing portion 9b opposed thereto may be formed as a tapered surface.

Yet further, in the above-mentioned embodiment, the bearing sleeve 8 is provided with the dynamic pressure generating portions formed of the herringbone or spiral dynamic pressure generating grooves, but the present invention is not limited thereto. The dynamic pressure generating portions may be formed as follows: forming dynamic pressure generating grooves having other shapes; or forming the inner peripheral surface 8a of the bearing sleeve 8 into a multi-arc shape obtained by combining a plurality of circular arcs. Alternatively, the dynamic pressure generating portions may be provided not to the inner peripheral surface 8a and the lower end surface 8b of the bearing sleeve 8 and to the inner bottom surface 7c1 of the housing 7, but to a member facing those surfaces across the bearing gaps (outer peripheral surface 2a1 of the shaft portion 2a and both the end surfaces 2b1 and 2b2 of the flange portion 2b of the shaft member 2). Still alternatively, what is called a cylindrical bearing may be formed, in which both the inner peripheral surface 8a of the bearing sleeve 8 and the outer peripheral surface 2a1 of the shaft portion 2a of the shaft member 2 are formed as cylindrical surfaces. In this case, the dynamic pressure generating portions for actively generating the dynamic pressure action are not formed, but still the dynamic pressure action is generated by slight centrifugal whirling of the shaft portion 2a.

Example

Figure 9:
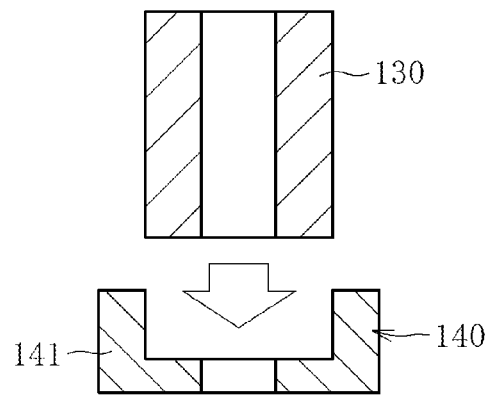
FIG. 9 A sectional view illustrating Example.
Figure 10A:
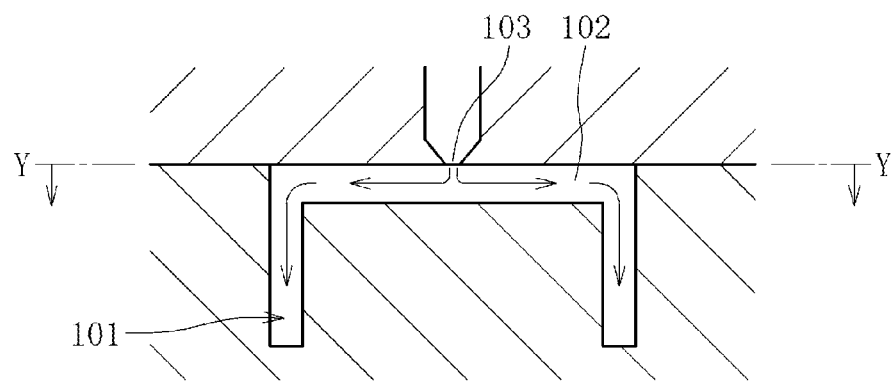
FIG. 10a A sectional view illustrating Reference Example of the die set for forming the sealing member by injection molding.
Figure 10B:
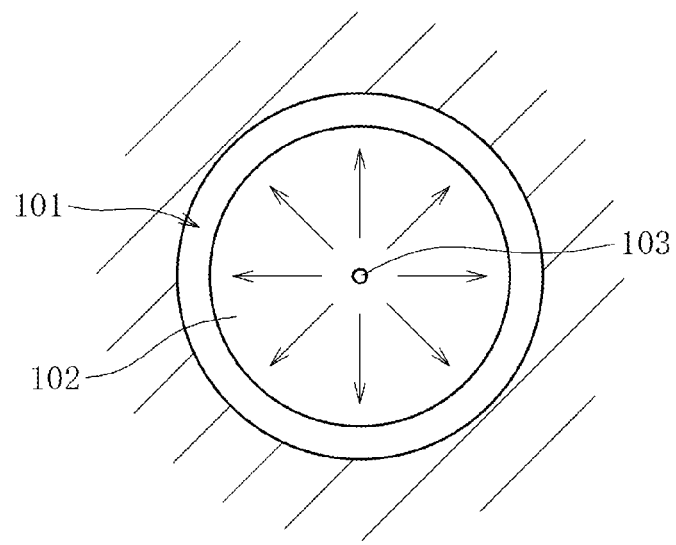
Figure 11:
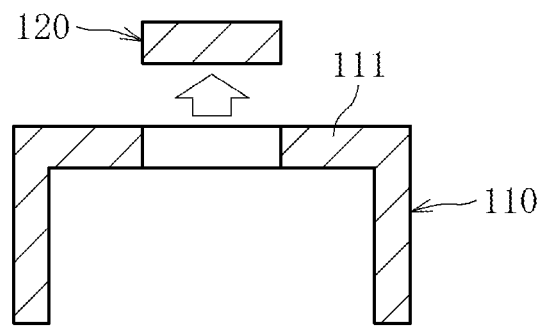
FIG. 11 A sectional view illustrating a method of forming the sealing member according to Reference Example.

In order to confirm advantages of the present invention, the following test was conducted: as illustrated in FIG. 9, a sleeve test sample 130 having the same structure as that of the bearing sleeve 8 according to the above-mentioned embodiment was press-fitted to an inner periphery of a seal test sample 140 having the same structure as that of the above-mentioned sealing member 9, and whether or not the seal test sample 140 was damaged was observed. As the seal test sample 140, there were prepared example seal test samples 140 each having a weld line formed at a circumferential intermediate portion between axial grooves (refer to FIG. 5), and comparison-example seal test samples 140 each having a weld line formed at a circumferential position corresponding to a deepest portion of one of axial grooves (not shown). Further, as each of the example seal test sample 140 and the comparison-example seal test sample 140, there were prepared a plurality of types of test samples different from each other in inner diameter dimension of a cylindrical portion 141, in other words, a plurality of types of test samples different from each other in press-fitting margin with respect to the sleeve test sample 130. The sleeve test sample 130 was made of a metal (brass), and the seal test samples 140 were made of a resin (PA6T). With regard to each of the seal test samples 140, an inner diameter of the cylindrical portion 141 was set to approximately 7.5 mm, and an outer diameter of the cylindrical portion 141 was set to 9 mm. An axial length of a press-fitting portion of the sleeve test sample 130 and the seal test sample 140 was set to 2.45 mm.

As shown in Table 1 below listing results of the above-mentioned test, in Example, breakage occurred only in example seal test samples 140 having a press-fitting margin of 90 µm or more, and in Comparison Example, breakage occurred only in comparison-example test samples 140 having a press-fitting margin of 50 µm or more. From this fact, it was confirmed that the seal test samples according to Example are higher in strength with respect to press-fitting of the sleeve test sample than the seal test samples according to Comparison Example.

TABLE 1

| Press-fitting margin (µm) | Example | Comparative Example |
| --- | --- | --- |
| 10 | No breakage | No breakage |
| 20 | ↑ | ↑ |
| 30 | ↑ | ↑ |
| 40 | ↑ | ↑ |
| 50 | ↑ | Breakage occurred |
| 60 | ↑ | |
| 70 | ↑ | |
| 80 | ↑ | |
| 90 | Breakage occurred | |

Note that, the sleeve test samples 130 and the seal test samples 140 as described above each have a size suited to fluid dynamic bearing devices which have a shaft member ranged a diameter from 2 mm to 4 mm and which are to be incorporated, for example, into a disk drive device for HDDs. In such fluid dynamic bearing devices, it is necessary to secure a press-fitting margin of approximately 40 µm between the sleeve and the seal. Of the seal test samples according to Comparison Example, breakage occurred only in seal test samples having a press-fitting margin of 50 µm or more. Thus, in consideration of safety factor, it is difficult to use those seal test samples as actual products. Meanwhile, the seal test samples according to Example each have a strength sufficient to withstand press-fitting with a press-fitting margin of up to 80 µm, and hence can be satisfactorily used even under a condition that a press-fitting margin is 40 µm or more.

In the following, description is made of an embodiment of a second invention of the subject application with reference to the drawings.

Figure 12:
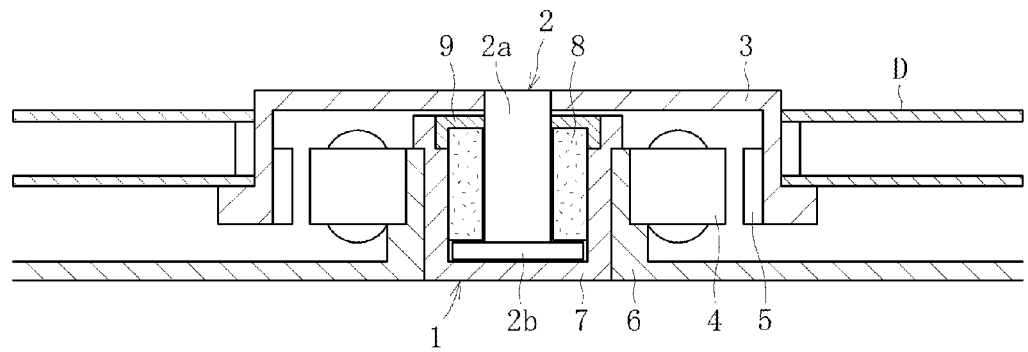
FIG. 12 A sectional view of a spindle motor of a disk drive device for HDDs.

FIG. 12 illustrates a spindle motor for information apparatus, which incorporates a fluid dynamic bearing device 1 according to the embodiment of the present invention. This spindle motor is used for disk drive devices for, for example, HDDs, and comprises the fluid dynamic bearing device 1 for rotatably supporting a shaft member 2, a disk hub 3 mounted to the shaft member 2, and stator coils 4 and rotor magnets 5 facing each other across a radial gap, for example. The stator coils 4 are fixed to an outer peripheral surface of a bracket 6, and the rotor magnets 5 are fixed to an inner peripheral surface of the disk hub 3. The fluid dynamic bearing device 1 is mounted to an inner periphery of the bracket 6. The disk hub 3 holds a predetermined number of disks D (two disks in FIG. 12) such as a magnetic disk. When the stator coils 4 are energized, the rotor magnets 5 are rotated by an electromagnetic force between the stator coils 4 and the rotor magnets 5. With this, the disk hub 3 and the shaft member 2 are rotated integrally with each other.

Figure 13:
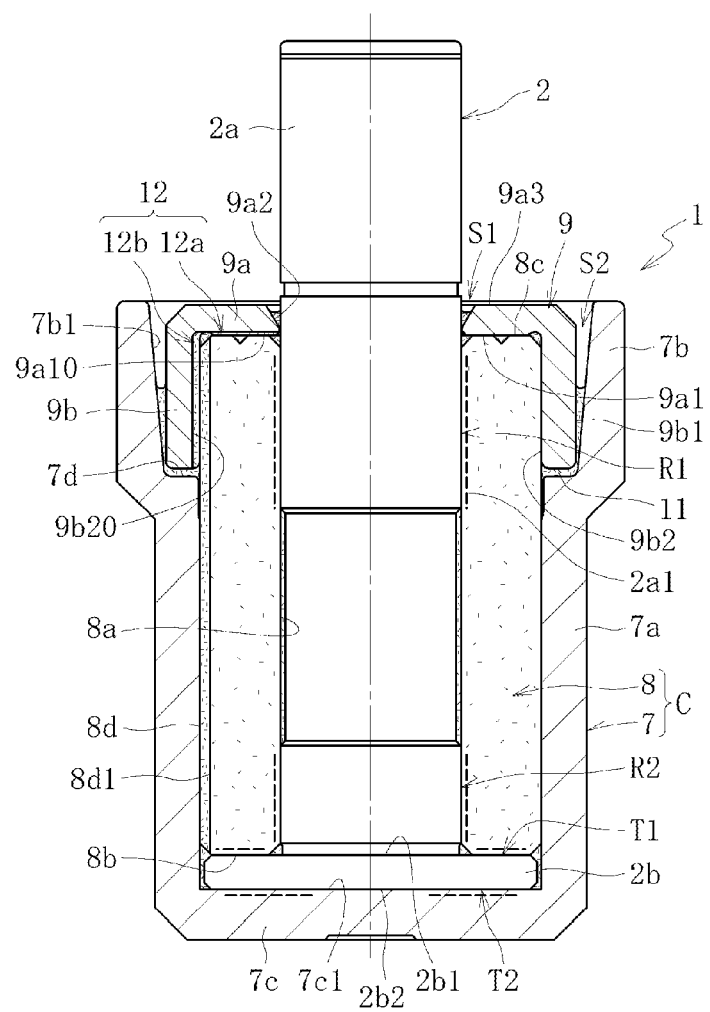
FIG. 13 A sectional view of a fluid dynamic bearing device.

The fluid dynamic bearing device 1 illustrated in FIG. 13 comprises, as main components, the shaft member 2, a bearing member C having an inner periphery along which the shaft member 2 is inserted, and a sealing member 9 provided at an opening portion of the bearing member C. In this embodiment, the bearing member C comprises a bottomed-cylindrical housing 7 opened at one end and closed at another end, and a bearing sleeve 8 fixed to an inner peripheral surface of the housing 7 and having an inner periphery along which the shaft member 2 is inserted. Note that, in the following, for the sake of convenience in description, in an axial direction, the opening side of the housing 7 is referred to as an upper side, and the opposite side is referred to as a lower side.

The shaft member 2 is made of, for example, a metal material such as a stainless steel, and comprises a shaft portion 2a, and a flange portion 2b provided at a lower end of the shaft portion 2a integrally or as a separate member. The shaft member 2 may be entirely made of a metal material, or may have a hybrid structure of a metal and a resin, which is obtained, for example, by forming a part (for example, both end surfaces) or the entirety of the flange portion 2b with a resin.

The bearing sleeve 8 is obtained by forming a sintered metal containing, for example, copper (or copper and iron) as a main component into a cylindrical shape. Alternatively, the bearing sleeve 8 may be formed of a soft metal such as brass.

On an inner peripheral surface 8a of the bearing sleeve 8, there are provided two upper and lower regions (dotted line parts of FIG. 13) to serve as respective radial bearing surfaces of a first radial bearing portion R1 and a second radial bearing portion R2 in a manner that the first radial bearing portion R1 and the second radial bearing portion R2 are axially spaced apart from each other. In those two regions, there are respectively formed dynamic pressure generating grooves 8a1 and 8a2 of a herringbone pattern as illustrated, for example, in FIG. 14. The dynamic pressure generating grooves 8a1 on the upper side are formed asymmetrically in the axial direction with respect to a belt-like part at an axially central portion of hill portions (indicated by cross-hatching in FIG. 14). Specifically, an axial dimension X1 of an upper region with respect to the belt-like part is larger than an axial dimension X2 of a lower region with respect to the belt-like part.

Figure 15:
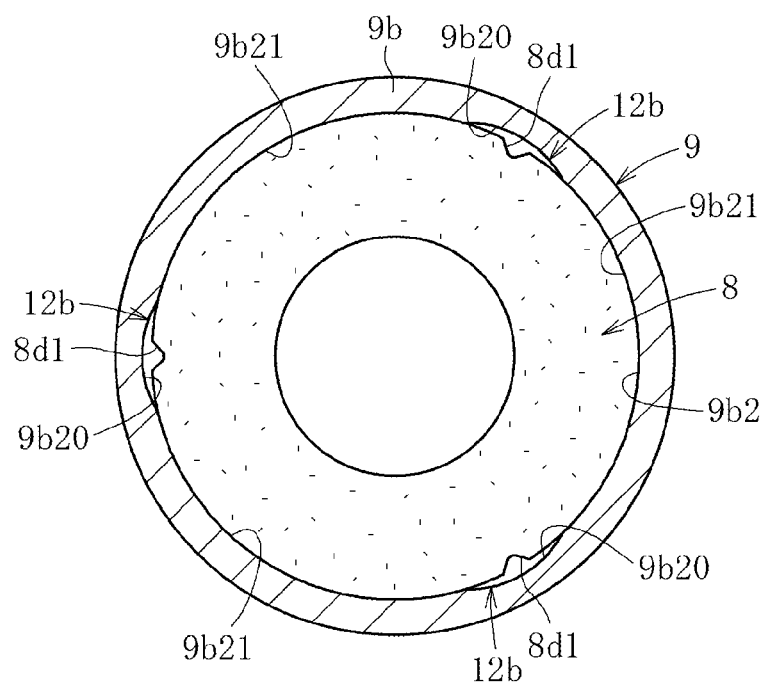
FIG. 15 A sectional view illustrating a state in which the bearing sleeve and the sealing member are fixed to each other by press-fitting.

On a lower end surface 8b of the bearing sleeve 8, there is provided a region (dotted line parts of FIG. 13) to serve as a thrust bearing surface of a first thrust bearing portion T1. In this region, although not shown, there are formed dynamic pressure generating grooves arranged, for example, in a spiral pattern. In an outer peripheral surface 8d of the bearing sleeve 8, there is formed an axial groove 8d1 for communicating both end surfaces 8b and 8c to each other. In this embodiment, for example, the axial groove 8d1 comprises three equiangularly arranged axial grooves 8d1 (refer to FIG. 15).

As illustrated in FIG. 13, the housing 7 is formed of a cylindrical small diameter portion 7a, a cylindrical large diameter portion 7b arranged on the small diameter portion 7a, and a bottom portion 7c sealing the opening portion at the lower end of the small diameter portion 7a. The small diameter portion 7a, the large diameter portion 7b, and the bottom portion 7c are formed integrally with each other. An inner peripheral surface of the small diameter portion 7a and an inner peripheral surface 7b1 of the large diameter portion 7b are continuous with each other through intermediation of a stepped surface 7d formed as a flat surface extending in a direction orthogonal to the axial direction. On an inner bottom surface 7c1 of the bottom portion 7c of the housing 7, there is provided a region (dotted line parts of FIG. 13) to serve as a thrust bearing surface of a second thrust bearing portion T2. In this region, there are formed dynamic pressure grooves (not shown) arranged, for example, in a spiral pattern. The housing 7 is formed of, for example, a resin. In order to prevent deformation due to difference in molding shrinkage amount, the small diameter portion 7a, the large diameter portion 7b, and the bottom portion 7c of the housing 7 are formed to have thicknesses substantially equal to each other.

Figure 16:
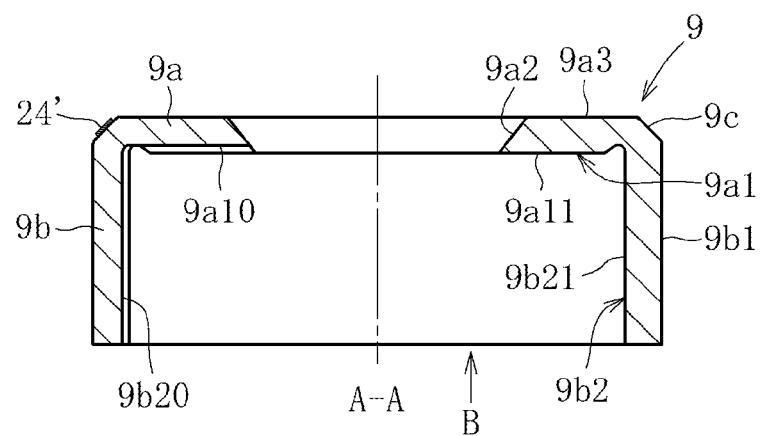
FIG. 16 A sectional view taken along the line A-A (FIG. 17) of the sealing member.
Figure 17:
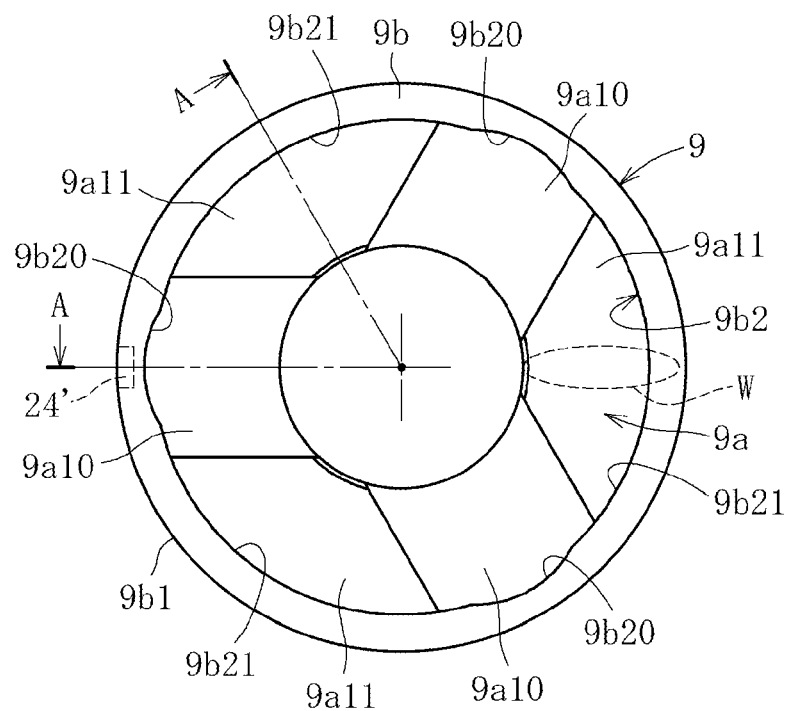
FIG. 17 A plan view of the sealing member viewed in a direction of the arrow B of FIG. 16.

As illustrated in FIGS. 16 and 17, the sealing member 9 is formed into an L-shape in cross-section comprising a disk-like first sealing portion 9a and a cylindrical second sealing portion 9b projecting downward from an outer-diameter end of the first sealing portion 9a. In a lower end surface 9a1 of the first sealing portion 9a, there are formed a predetermined number of radial grooves 9a10 horizontally extending in the radial direction across the lower end surface 9a1. In an inner peripheral surface 9b2 of the second sealing portion 9b, there are formed a predetermined number of axial grooves 9b20 vertically extending in the axial direction across the inner peripheral surface 9b2 at the same circumferential positions as those of the radial grooves 9a10. In the illustration, the radial groove 9a10 and the axial groove 9b20 respectively comprise three radial grooves 9a10 and three axial grooves 9b20, which are equiangularly arranged (refer to FIG. 17).

Figure 18:
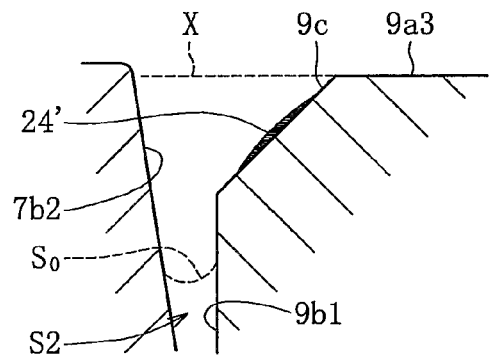
FIG. 18 An enlarged sectional view illustrating a vicinity of a gate mark of the sealing member.

As illustrated in FIG. 18, a gate mark 24' is formed at an upper end portion of an outer peripheral surface 9b1 of the second sealing portion 9b. The gate mark 24' is formed at a position lower than an axial position X of an outer end surface of the sealing member 9 (upper end surface 9a3 of the first sealing portion 9a in FIG. 18). Further, the gate mark 24' is positioned so as not to be held in contact with the lubricating oil filling the inside of the housing 7, specifically, provided on the atmosphere side with respect to an oil surface maintained in a second seal space S2 to be formed between the outer peripheral surface 9b1 of the sealing member 9 and the inner peripheral surface 7b1 of the housing 7 (upper side in FIG. 18). Note that, a position of the oil surface in the second seal space S2 fluctuates owing to volumetric expansion and shrinkage of the lubricating oil in accordance with a variation in temperature. Thus, the gate mark 24' is provided on the atmosphere side with respect to an upper end position $S_0$ of the oil surface. In this embodiment, a chamfered portion 9c is formed on the upper end portion of the outer peripheral surface 9b1 of the second sealing portion 9b, and the gate mark 24' is formed at the chamfered portion 9c.

As illustrated in FIG. 17, the gate mark 24' is formed at a circumferential position of one of the axial grooves 9b20, and a weld line W is formed at a position on the opposite side of the gate mark 24' with respect to an axial center. The weld line W is formed so as to horizontally extend in the radial direction across the first sealing portion 9a and vertically extend in the axial direction across the second sealing portion 9b. Specifically, the weld line W of the second sealing portion 9b is formed in a region of a cylindrical surface 9b21 between the axial grooves 9b20 in the circumferential direction, and the weld line W of the first sealing portion 9a is formed in a region of a flat surface 9a11 between the radial grooves 9a10 in the circumferential direction. As described above, the weld line W is formed at the position out of the thin portions of the sealing member 9 so that reduction in strength of the sealing member 9 is prevented.

The sealing member 9 structured as described above is formed by injection molding of a resin. It is preferred to select, as the resin for the sealing member 9, a material which is relatively slowly cured and is excellent in oil resistance. For example, it is possible to suitably use crystalline resins, specifically, a crystalline resin selected from a group consisting of PPS, ETFE, PEEK, PA66, PA46, PA6T, and PA9T. More specifically, the following can be used.

PPS: cross-linked PPS RG-40JA and linear PPS RE-04 manufactured by AGC MATEX CO., LTD.;

ETFE: Neoflon EP-521 and EP-541 manufactured by DAIKIN INDUSTRIES, ltd.;

PEEK by Vi: PEEK 150GL15, PEEK 150GL30, PEEK 450GL15, and PEEK 450GL30 manufactured ctrex plc.;

PA66: A3HG5 manufactured by BASF SE;

PA46: TW300 manufactured by DSM N.V.;

PA6T: ARLEN RA230NK manufactured by Mitsui Chemicals, Inc.; and

PA9T: Genestar GR2300 manufactured by KURARAY CO., LTD. It can be said that, of those crystalline resins, PA6T is an optimum material for the sealing member because PAT6 exhibits most excellent properties, specifically, provides highest strength to portions at which the weld line W is to be formed and highest oil resistance against an ester-based lubricating oil. Note that, those crystalline resins may be used singly or in a combination of a plurality of types of those crystalline resins. Examples of filler that may be contained with the above-mentioned resin comprise fibrous filler such as glass fiber, whisker-like filler such as potassium titanate, scale-like filler such as mica, and conductive filler such as carbon fiber, carbon black, graphite, carbon nanomaterial, and metal powder.

Figure 19:
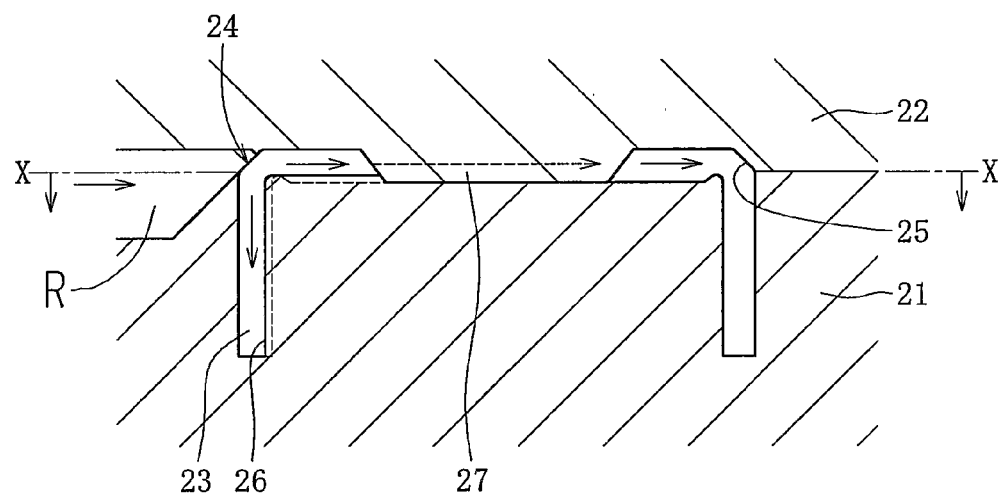
FIG. 19 A sectional view of a die set for forming the sealing member by injection molding.
Figure 20:
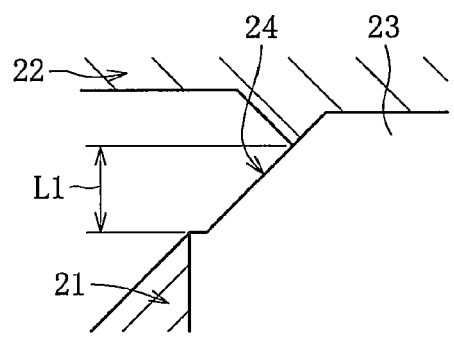
FIG. 20 An enlarged sectional view illustrating a vicinity of a gate of the die set of FIG. 19.
Figure 21:
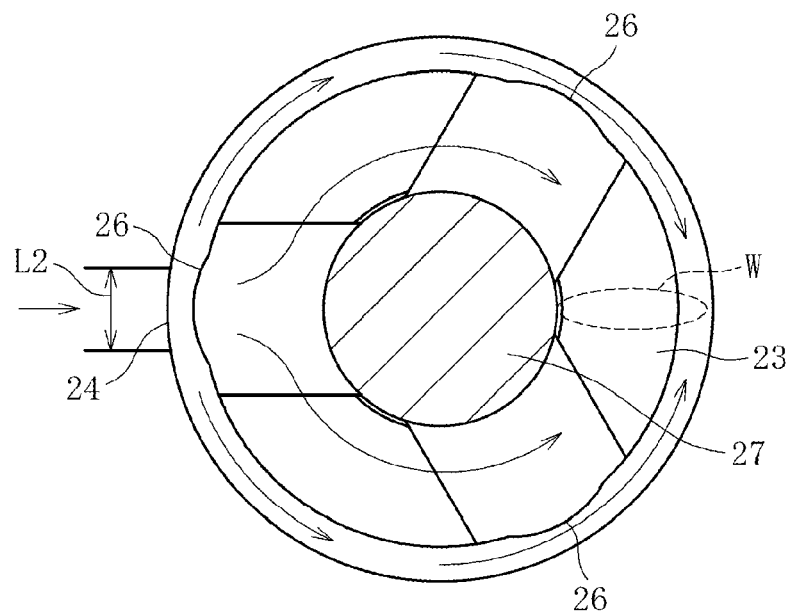
FIG. 21 A sectional view taken along the line X-X of the die set of FIG. 19.

Here, description is made of injection molding of the sealing member 9. A die set used for injection molding of the sealing member 9 is formed of a fixed die 21 and a movable die 22 as illustrated in FIG. 19, and a cavity 23 and a gate 24 are formed in a clamped state. The gate 24 is what is called a side gate provided in a clamping surface of the fixed die 21 and the movable die 22. The gate 24 is provided in a tapered molding surface 25 provided to form the chamfered portion 9c of the sealing member 9, and is arranged to come to a circumferential position of one of molding portions 26 provided to form the axial grooves 9b20 of the second sealing portion 9b. The gate 24 is formed into a horizontally-long rectangular shape in which a circumferential dimension L2 (refer to FIG. 21) is larger than an axial dimension L1 (refer to FIG. 20). In this state, when a molten resin is injected from the gate 24, a flow of the resin is bisected by a projecting portion 27 provided to form a hollow portion of the first sealing portion 9a, and then the bisected flows merge on the opposite side of the gate 24. In this embodiment, three axial grooves 9b20 are arranged at equal intervals in the inner peripheral surface of the second sealing portion 9b. Thus, an opposite side of each of the axial grooves 9b20 with respect to the axial center corresponds to a circumferential central portion between the other two axial grooves 9b20. Therefore, when the gate 24 is arranged at a circumferential position corresponding to one of the axial grooves 9b20, the weld line W is formed at the circumferential central portion between the other two axial grooves 9b20.

Figure 22A:
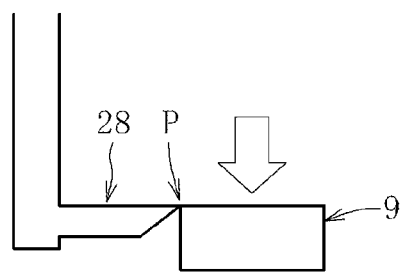
FIG. 22a A side view illustrating a step of separating a resin cured in a runner and the sealing member from each other.
Figure 22B:
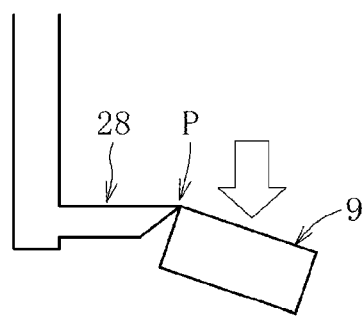
FIG. 22b Another side view illustrating the step of separating the resin cured in the runner and the sealing member from each other.
Figure 22C:
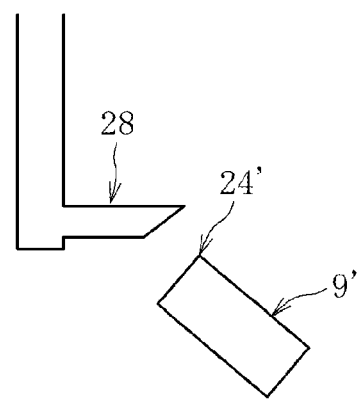
FIG. 22c Still another side view illustrating the step of separating the resin cured in the runner and the sealing member from each other.
Figure 23:
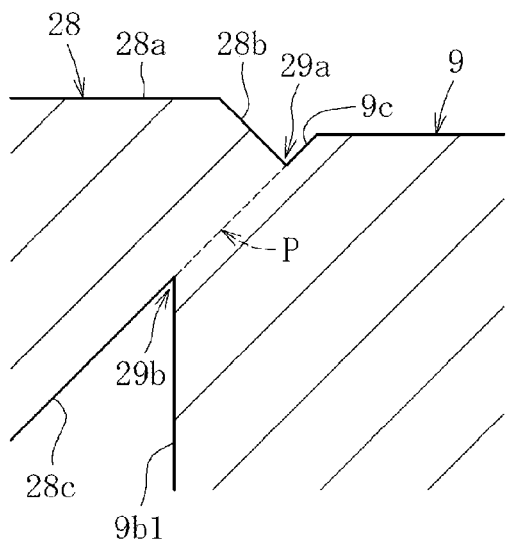
FIG. 23 An enlarged sectional view of a boundary portion of an integrally-molded product of the resin cured in the runner and the sealing member.

After that, a resin-molded product is taken out of the die set. As illustrated in FIG. 22, this resin-molded product is an integral piece of a runner resin portion 28 cured in a runner and the sealing member 9. As illustrated in FIG. 23, at a boundary portion of the runner resin portion 28 and the sealing member 9 of the resin-molded product (that is, gate portion P), there are formed V grooves 29a and 29b. Specifically, at an upper end portion of the gate portion P, the V groove 29a is formed of an inclined portion 28b provided at an end portion on the sealing member 9 side of an upper surface 28a of the runner resin portion 28, and the chamfered portion 9c formed at an upper end of the outer peripheral surface 9b1 of the sealing member 9. Further, at a lower end portion of the gate portion P, the V groove 29b is formed of an inclined portion 28c provided at a lower surface of the runner resin portion 28 and the outer peripheral surface 9b1 of the sealing member 9.

The integral piece as described above of the runner resin portion 28 and the sealing member 9 is cut at the gate portion P to be separated. Specifically, under a state in which the runner resin portion 28 is fixed, downward load is applied to the sealing member 9 (refer to FIG. 22a), and then the gate portion P is bent (refer to FIG. 22b). In this way, the gate portion P is cut and the runner resin portion 28 and the sealing member 9 are separated from each other (refer to FIG. 22c). In this case, the V groove 29a is formed at the upper end portion of the gate portion P, in other words, formed on a side to which the integral piece is stretched when the gate portion P is bent. Thus, the gate portion P is cut from the V groove 29a. As a result, the integral piece of the runner resin portion 28 and the sealing member 9 can be accurately cut at the gate portion P. Further, the V groove 29b is formed also at the lower end portion of the gate portion P, in other words, formed also on a side to which the integral piece is compressed when the gate portion P is bent. Thus, the gate portion P is bent from the V groove 29b. As a result, the above-mentioned integral piece can be more accurately cut at the gate portion P.

On the sealing member 9 separated from the runner resin portion 28, the gate mark 24' as a result of cutting the gate portion P is formed (refer to FIG. 18). As described above, when the gate portion P is cut by bending, the gate mark 24' is not stretched unlike, for example, a case where the gate portion P is plucked off simultaneously with opening the die set. In particular, when gate cutting is performed after the mold is taken out of the die set as described above, the gate portion P can be cut under a state in which the resin is perfectly cured. Thus, a situation in which the gate mark 24' is stretched is more reliably prevented. In this way, the integral piece can be accurately cut at the gate portion P. Thus, even without a post-treatment process after cutting, a situation in which the gate mark 24' projects upward with respect to an outer end surface (upper end surface 9a3) of the sealing member 9 is avoided, with the result that the gate mark 24' and the disk hub 3 are prevented from interfering with each other. Note that, after the gate portion P has been cut, the gate mark 24' may be subjected to the post-treatment process. In this case, the gate mark 24' that has undergone the post-treatment process is left on the outer peripheral surface 9b1 (chamfered portion 9c) of the sealing member 9.

As illustrated in FIG. 13, the sealing member 9 formed as described above is fixed to the upper end of the outer periphery of the bearing sleeve 8 by press-fitting. Specifically, the inner peripheral surface 9b2 of the second sealing portion 9b of the sealing member 9 is press-fitted to the outer peripheral surface 8d of the bearing sleeve 8 from above. With this, the outer peripheral surface 9b1 of the second sealing portion 9b, around which the second seal space S2 is formed, can be conformed to the outer peripheral surface 8d of the bearing sleeve 8. Thus, when the outer peripheral surface 8d of the bearing sleeve 8 is formed with high accuracy, a dimensional accuracy of the outer peripheral surface 9b1 of the sealing member 9 can be increased in accordance therewith. With this, a capacity of the second seal space S2 can be set with high accuracy. Further, as described above, the fragile weld line W is formed at the position out of thin portions of the sealing member 9 (the radial groove 9a10 of the first sealing portion 9a and the axial groove 9b20 of the second sealing portion 9b). Thus, the sealing member 9 is prevented from being provided with parts having locally markedly low strength, and hence damage to be caused by press-fitting is prevented.

Under a state in which the sealing member 9 is fixed to the bearing sleeve 8, the lower end surface 9a1 of the first sealing portion 9a of the sealing member 9 abuts against the upper end surface 8c of the bearing sleeve 8, and the lower end surface of the second sealing portion 9b faces the stepped surface 7d of the housing 7 across a predetermined axial gap 11. Further, a first seal space S1 having a predetermined capacity is formed between the inner peripheral surface 9a2 of the first sealing portion 9a and an outer peripheral surface 2a1 of the shaft portion 2a, and the second seal space S2 having a predetermined capacity is formed between the outer peripheral surface 9b1 of the second sealing portion 9b and an inner peripheral surface 7b1 of the large diameter portion 7b of the housing 7. In this embodiment, the inner peripheral surface 9a2 of the first sealing portion 9a and the inner peripheral surface 7b1 of the large diameter portion 7b of the housing 7 are each formed as a tapered surface increased upward in diameter. Accordingly, the first seal space S1 and the second seal space S2 each exhibit a tapered shape gradually diminished downward.

In this case, between the lower end surface 9a1 of the first sealing portion 9a and the upper end surface 8c of the bearing sleeve 8 and between the inner peripheral surface 9b2 of the second sealing portion 9b and the outer peripheral surface 8d of the bearing sleeve 8, there are formed communication paths 12 for communicating the first seal space S1 and the second seal space S2 to each other. Specifically, each of the radial grooves 9a10 formed in the lower end surface 9a1 of the first sealing portion 9a and the upper end surface 8c of the bearing sleeve 8 form a radial communication path 12a (refer to FIG. 13), and each of the axial grooves 9b20 formed in the inner peripheral surface 9b2 of the second sealing portion 9b and corresponding one of the axial grooves 8d1 formed in the outer peripheral surface 8d of the bearing sleeve 8 form an axial communication path 12b (refer to FIG. 15).

In order to maintain pressure balance of a lubricating oil in both the seal spaces S1 and S2 within a proper range, the communication paths 12 need to have a predetermined flow-path area or more. However, when the axial grooves 9b20 are formed along the second sealing portion 9b as described above, there is a risk that the second sealing portion 9b is partially thinned and strength decreases. Thus, the size of the axial grooves 9b20 (depth and circumferential width) cannot be unnecessarily increased. In particular, the second sealing portion 9b receives high load by being press-fitted to the bearing sleeve 8, and hence it is necessary to secure strength as high as possible. In order to secure high strength, as described above, the following structure may be employed. The axial communication paths 12b may be formed with cooperation of the axial grooves 9b20 of the second sealing portion 9b and the axial grooves 8d1 of the bearing sleeve 8, thereby securing the flow-path area of the axial communication paths 12b while downsizing the axial grooves 9b20 of the second sealing portion 9b and securing strength of the sealing member 9.

In the above-mentioned structure, the interior space of the housing 7, which is sealed with the sealing member 9 and comprises inner pores of the bearing sleeve 8, is filled with a lubricating oil (for example, ester-based lubricating oil), and thus the fluid dynamic bearing device 1 as illustrated in FIG. 13 is completed.

When the shaft member 2 is rotated, radial bearing gaps are formed between the radial bearing surfaces of the inner peripheral surface 8a of the bearing sleeve 8 and the outer peripheral surface 2a1 of the shaft portion 2a. Further, thrust bearing gaps are formed respectively between the thrust bearing surface of the lower end surface 8b of the bearing sleeve 8 and an upper end surface 2b1 of the flange portion 2b and between the thrust bearing surface of the inner bottom surface 7c1 of the housing 7 and a lower end surface 2b2 of the flange portion 2b. Further, along with rotation of the shaft member 2, a dynamic pressure of a lubricating oil is generated in the radial bearing gaps due to the dynamic pressure generating grooves 8a1 and 8a2 of the radial bearing surfaces, and the shaft portion 2a of the shaft member 2 is rotatably supported in the radial direction in a non-contact manner through a lubricating oil film formed within the radial bearing gaps. As a result, there are formed the first radial bearing portion R1 and the second radial bearing portion R2 for rotatably supporting the shaft member 2 in the radial direction in a non-contact manner. Simultaneously, a dynamic pressure of a lubricating oil is generated in the thrust bearing gaps due to the dynamic pressure generating grooves of the thrust bearing surfaces, and the shaft member 2 is rotatably supported in the thrust direction in a non-contact manner through a lubricating oil film formed in the thrust bearing gaps. As a result, there are formed the first thrust bearing portion T1 and the second thrust bearing portion T2 for rotatably supporting the shaft member 2 in both the thrust directions in a non-contact manner.

Further, during rotation of the shaft member 2, the first and second seal spaces S1 and S2 each exhibit a tapered shape gradually diminished toward the inside of the housing 7 as described above. Therefore, owing to drawing-in action caused by a capillary force, a lubricating oil in both the seal spaces S1 and S2 is drawn in a direction in which the seal spaces are narrowed, that is, drawn toward the inside of the housing 7. As a result, it is possible to effectively prevent leakage of the lubricating oil from the inside of the housing 7. Further, the seal spaces S1 and S2 each have a buffering function with which the volume amount varied in accordance with the variation in temperature of the lubricating oil filling the interior spaces of the housing 7 is absorbed. Within the expected range of the variation in temperature, the oil surfaces of the lubricating oil are constantly formed in the seal spaces S1 and S2.

Figure 14:
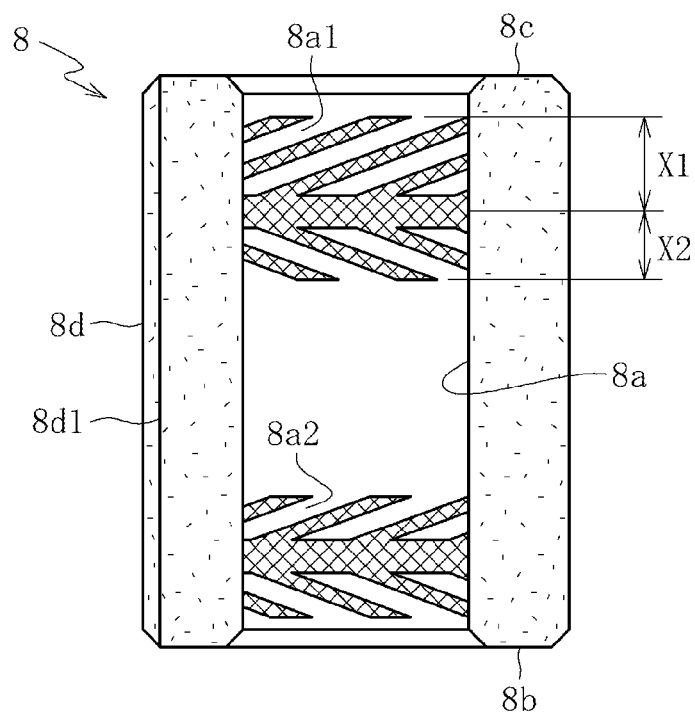
FIG. 14 A sectional view of a bearing sleeve.

As described above, the dynamic pressure generating grooves 8a1 on the upper side are formed asymmetrically in the axial direction (refer to FIG. 14). Thus, during rotation of the shaft member 2, there is generated a force by which the lubricating oil in the radial bearing gaps is pushed downward, and the force thus generated circulates the lubricating oil through the path formed of the thrust bearing gap of the first thrust bearing portion T1, the fluid paths formed of the axial grooves 8d1 of the bearing sleeve 8, and the communication paths 12 between the sealing member 9 and the bearing sleeve 8 in the stated order. With this, the pressure balance of the lubricating oil can be maintained, and it is possible to solve problems such as generation of bubbles due to local generation of a negative pressure, and leakage of the lubricating oil and occurrence of vibration caused by the generation of bubbles. Further, the first seal space S1 communicates to the above-mentioned circulation path, and the second seal space S2 communicates thereto via the axial gap 11. Thus, even when bubbles are mixed into the lubricating oil for some reason or other, such bubbles are discharged into the atmosphere via the oil surfaces of the lubricating oil within those seal spaces S1 and S2 when the bubbles circulate with the lubricating oil. Thus, adverse effects caused by the bubbles are prevented even more effectively.

The present invention is not limited to the above-mentioned embodiments. In the following, still another embodiment of the present invention is described, but members having the same functions as those in the above-mentioned embodiments are denoted by the same reference symbols, and redundant description thereof is omitted.

Figure 24:
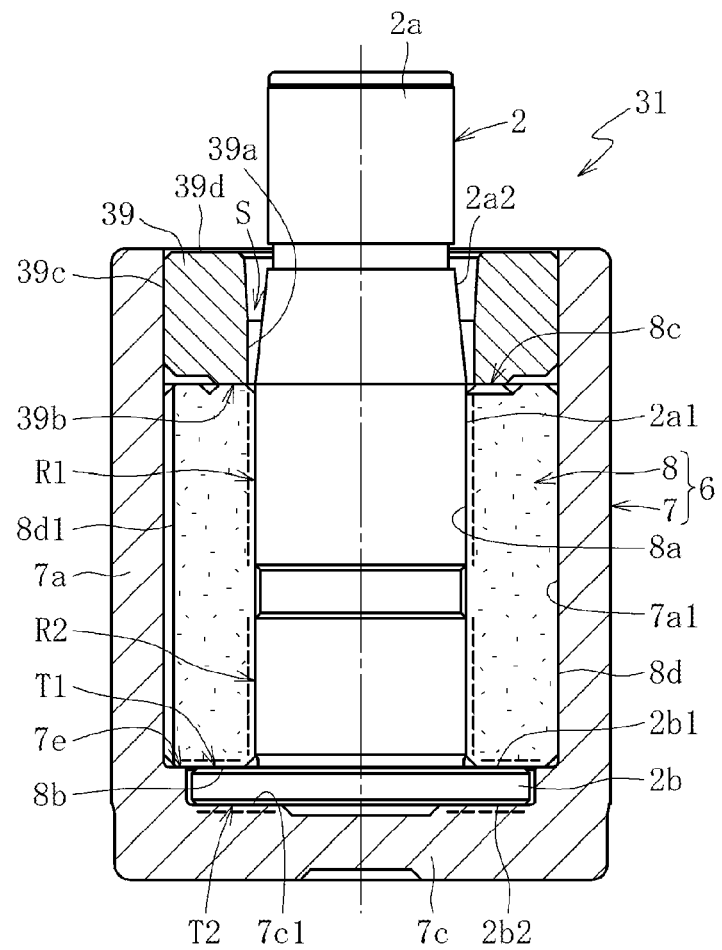
FIG. 24 A sectional view of a fluid dynamic bearing device according to another embodiment.

The present invention is applicable also to a fluid dynamic bearing device 31 as illustrated in FIG. 24. In the fluid dynamic bearing device 31, there is formed a seal space S between an inner peripheral surface 39a of a sealing member 39 and a tapered surface 2a2 formed on an outer peripheral surface of the shaft member 2, and an outer peripheral surface 39c of the sealing member 39 is fixed to an inner peripheral surface 7a1 of the housing 7. The outer peripheral surface 39c of the sealing member 39 and the inner peripheral surface 7a1 of the housing 7, which are loosely fitted to each other across a gap, are fixed to each other by what is called gap-filling bonding performed by curing an adhesive G within the fitting gap (refer to FIG. 25). A lower end surface 39b of the sealing member 39 abuts against the upper end surface 8c of the bearing sleeve 8, and comes into contact with the lubricating oil filling the inside of the housing 7. The lower end surface 8b of the bearing sleeve 8 abuts against a step portion 7e formed at a lower end portion of the inner peripheral surface 7a1 of the housing 7. Radial grooves 8c1 are formed in the upper end surface 8c of the bearing sleeve 8, and those radial grooves 8c1 form communication paths for the lubricating oil.

Figure 25:
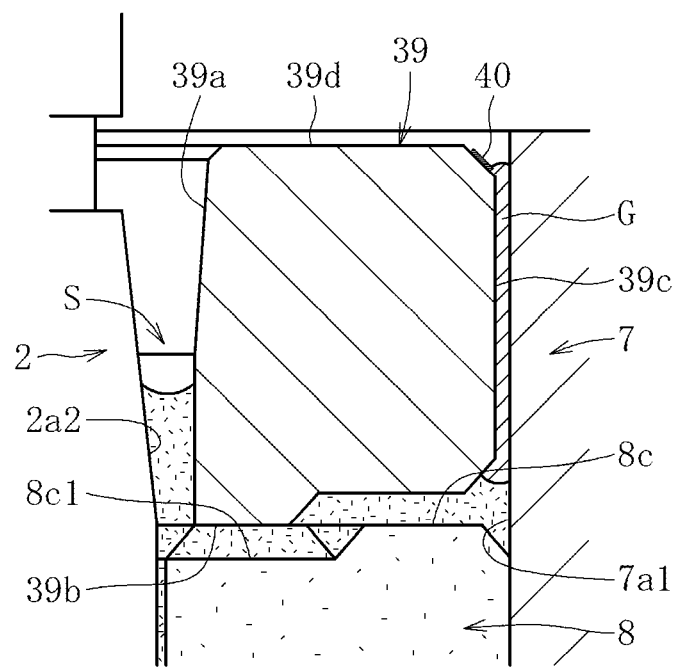
FIG. 25 An enlarged sectional view of the fluid dynamic bearing device of FIG. 24.
Figure 26:
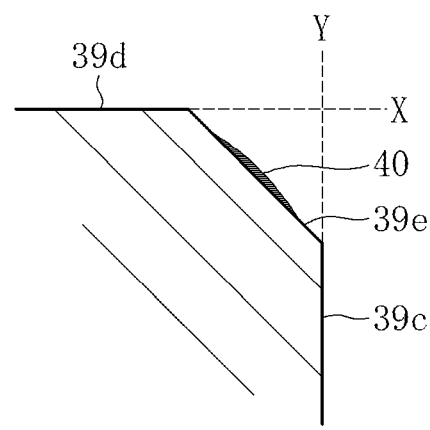
FIG. 26 An enlarged sectional view of a sealing member of FIG. 24.
Figure 27A:
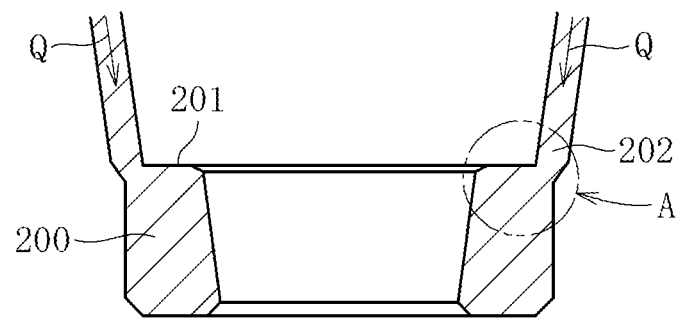
FIG. 27a A sectional view illustrating a step of molding a conventional sealing member.
Figure 27B:
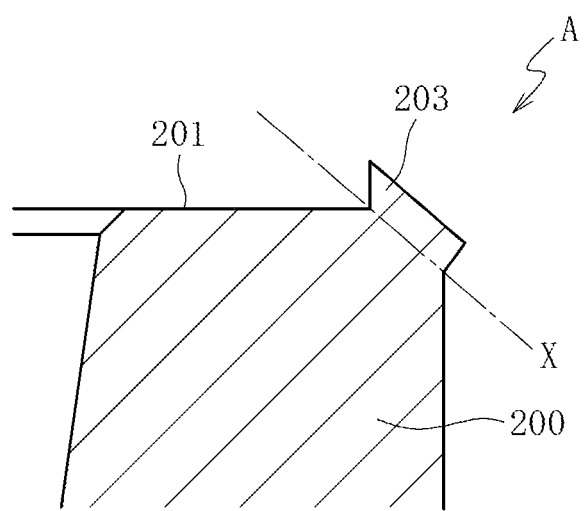
FIG. 27b An enlarged view of a part of the sealing member of FIG. 27a, from which a gate portion has been cut off.
Figure 28A:
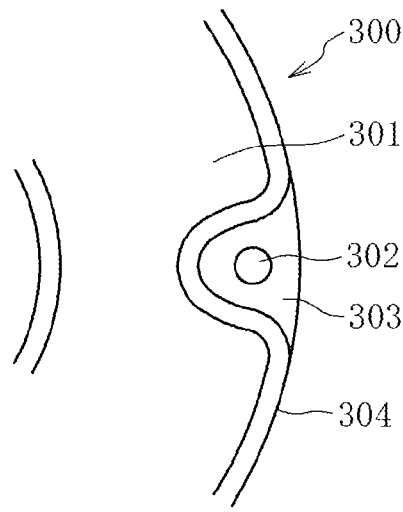
FIG. 28a A top view of a sealing member according to Reference Example.
Figure 28B:
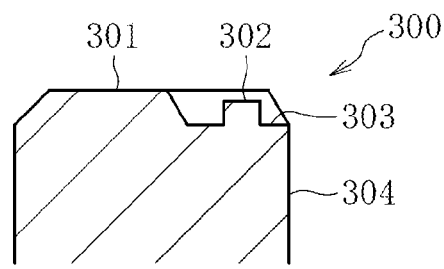
Figure 29:
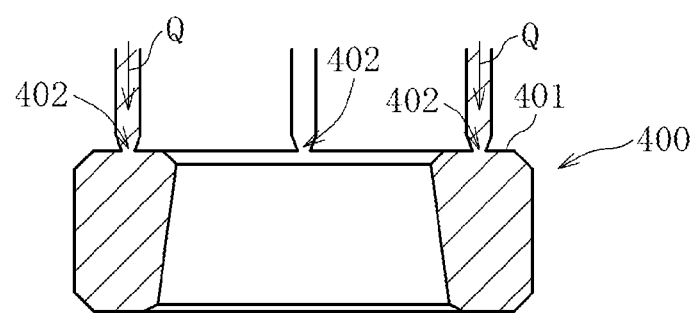
FIG. 29 A sectional view illustrating a step of molding a conventional sealing member.

As in the above-mentioned embodiments, the sealing member 39 is formed by injection molding with use of a side gate. As illustrated in FIG. 25, a gate mark 40 is formed on the outer peripheral surface 39c. As illustrated in FIG. 26, the gate mark 40 is provided below the axial position X of an upper end surface 39d of the sealing member 39 and on an inner-diameter side with respect to a radial position Y of the outer peripheral surface 39c of the sealing member 39. Further, the gate mark 40 is formed at a position at which the gate mark 40 is out of contact with the lubricating oil filling the inside of the housing 7, specifically, at a position out of an inner end portion of a fixation surface with respect to the housing 7 on the outer peripheral surface 39c of the sealing member 39 (lower end portion in FIG. 26). In this embodiment, the gate mark 40 is formed on a chamfered portion 39e provided on an upper end portion of the outer peripheral surface 39c of the sealing member 39. As described above, when the gate mark 40 is provided below the axial position X of the upper end surface 39d of the sealing member 39, the gate mark 40 and the disk hub 3 are prevented from interfering with each other. Further, when the gate mark 40 is provided on an inner-diameter side with respect to the outer peripheral surface 39c of the sealing member 39, the gate mark 40 and the inner peripheral surface 7a1 of the housing 7 are prevented from interfering with each other.

In the above-mentioned embodiments, the bearing sleeve 8 is provided with the dynamic pressure generating portions formed of the herringbone or spiral dynamic pressure generating grooves, but the present invention is not limited thereto. The dynamic pressure generating portions may be formed as follows: forming dynamic pressure generating grooves having other shapes; or forming the inner peripheral surface 8a of the bearing sleeve 8 into a multi-arc shape obtained by combining a plurality of circular arcs. Alternatively, the dynamic pressure generating portions may be provided not to the inner peripheral surface 8a and the lower end surface 8b of the bearing sleeve 8 and to the inner bottom surface 7c1 of the housing 7, but to a member facing those surfaces across the bearing gaps (outer peripheral surface 2a1 of the shaft portion 2a and both the end surfaces 2b1 and 2b2 of the flange portion 2b of the shaft member 2). Still alternatively, what is called a cylindrical bearing may be formed, in which both the inner peripheral surface 8a of the bearing sleeve 8 and the outer peripheral surface 2a1 of the shaft portion 2a of the shaft member 2 are formed as cylindrical surfaces. In this case, the dynamic pressure generating portions for actively generating the dynamic pressure action are not formed, but still the dynamic pressure action is generated by slight centrifugal whirling of the shaft portion 2a.

Note that, the structure of the first invention and the structure of the second invention of the subject application described above may be combined with each other.

REFERENCE SIGNS LIST 1 fluid dynamic bearing device
2 shaft member
7 housing
8 bearing sleeve
9 sealing member
9a first sealing portion
9a10 radial groove
9b second sealing portion
9b20 axial groove
R deepest portion of axial groove
W weld line
12 communication path
D disk
R1, R2 radial bearing portion
T1, T2 thrust bearing portion
S1, S2 seal space

The invention claimed is:
1. A manufacturing method of a fluid dynamic bearing device, the fluid dynamic bearing device comprising:
a shaft member;
a bearing member having an inner periphery along which the shaft member is inserted;
a sealing member fixed to an opening portion of the bearing member so as to seal a lubricating oil filling an inside of the bearing member; and
a radial bearing portion for generating a dynamic pressure action of the lubricating oil in a radial bearing gap between an outer peripheral surface of the shaft member and an inner peripheral surface of the bearing sleeve so as to support the shaft member in a radial direction;
the manufacturing method comprising:
injecting a molten resin from a runner which is provided along a clamping surface of a die set into a cavity through a side gate formed in a chamfered molding surface for molding a chamfered portion formed at an upper end in an axial direction of an outer peripheral surface of the sealing member;
opening the die set after the resin has been cured without separating a runner resin portion composed of an entirety of a resin cured in the runner and the sealing member;
taking out a resin-molded product formed of an integral piece of the runner resin portion and the sealing member from the die set without separating the runner resin portion and the sealing member; and
separating, after taking out the resin-molded product from the die set, the runner resin portion and the sealing member from each other.

2. A manufacturing method of the fluid dynamic bearing device according to claim 1,
wherein the runner resin portion and the sealing member of the resin-molded product are separated from each other by bending a boundary portion between the runner resin portion and the sealing member.

3. A manufacturing method of the fluid dynamic bearing device according to claim 1,
wherein a V groove is provided at the boundary portion between the runner resin portion and the outer peripheral surface of the sealing member in the resin-molded product.

4. A manufacturing method of the fluid dynamic bearing device according to claim 1,
wherein the runner and the side gate are provided at only one location in circumferential direction of the sealing member.

5. A manufacturing method of fluid dynamic bearing device according to claim 1,
wherein there is no post-treatment process after separating the runner resin portion and the sealing member from each other, and
wherein a gate mark formed on the chamfered portion of the sealing member is provided at a position lower than an axial position of an outer end surface of the sealing member.

6. A manufacturing method of fluid dynamic bearing device, the fluid dynamic bearing device comprising:
a shaft member;
a bearing member having an inner periphery along which the shaft member is inserted;
a housing having an inner periphery surface to which the bearing member is fixed;
a sealing member comprising:
a disk-like first sealing portion; and
a cylindrical second sealing portion projecting from an outer-diameter end of the first sealing portion;
a radial bearing portion for generating a dynamic pressure action of the lubricating oil in a radial bearing gap between an outer peripheral surface of the shaft member and an inner peripheral surface of the bearing sleeve so as to support the shaft member in a radial direction;
a first seal space formed between an inner peripheral surface of the disk-like first sealing portion of the sealing member and the outer peripheral surface of the shaft member; and
a second seal space formed between an outer peripheral surface of the cylindrical second sealing portion of the sealing member and the inner peripheral surface of the housing;
the manufacturing method comprising:
injecting a molten resin from a runner which is provided along a clamping surface of a die set into a cavity through a side gate formed in a chamfered molding surface for molding a chamfered portion formed at an upper end in an axial direction of the outer peripheral surface of the cylindrical second sealing portion of the sealing member;
opening the die set after the resin has been cured without separating a runner resin portion composed of an entirety of a resin cured in the runner and the sealing member;
taking out a resin-molded product formed of an integral piece of the runner resin portion and the sealing member from the die set without separating the runner resin portion and the sealing member; and
separating, after taking out the resin-molded product from the die set, the runner resin portion and the sealing member from each other.

7. A manufacturing method of fluid dynamic bearing device according to claim 6,
wherein there is no post-treatment process after separating the runner resin portion and the sealing member from each other, and
wherein a gate mark formed on the chamfered portion of the sealing member is provided at a position lower than an axial position of an outer end surface of the sealing member.

* * * * *